US012699363B2

(12) United States Patent
Sarkissian

(10) Patent No.: US 12,699,363 B2
(45) Date of Patent: Aug. 4, 2026

(54) DEVICES, SYSTEMS, AND METHODS FOR AUTONOMOUSLY GENERATING AND IMPLEMENTING MACHINE EXECUTABLE FILES

(71) Applicant: AI-ID, Inc., Reno, NV (US)

(72) Inventor: Shaunt Sarkissian, Reno, NV (US)

(73) Assignee: AI-ID, Inc., Reno, NV (US)

( * ) Notice: Subject to any disclaimer, the term of this patent is extended or adjusted under 35 U.S.C. 154(b) by 36 days.

(21) Appl. No.: 18/792,290

(22) Filed: Aug. 1, 2024

(65) Prior Publication Data

US 2026/0036947 A1 Feb. 5, 2026

(51) Int. Cl.
*G05B 13/02* (2006.01)

(52) U.S. Cl.
CPC ................................. *G05B 13/0265* (2013.01)

(58) Field of Classification Search
CPC .................................................. G05B 13/0265
USPC .......................................................... 700/47
See application file for complete search history.

(56) References Cited

U.S. PATENT DOCUMENTS

| | | | | |
|---|---|---|---|---|
| 2015/0286191 | A1* | 10/2015 | El Dokor | G05B 13/0265 |
| | | | | 700/47 |
| 2021/0055442 | A1* | 2/2021 | Rangarajan | G06N 7/01 |
| 2022/0089181 | A1* | 3/2022 | Gross | G07C 5/0841 |
| 2022/0291685 | A1* | 9/2022 | Inacio De Matos ... | G05D 1/695 |
| 2022/0414452 | A1* | 12/2022 | Gurev | G06N 3/08 |
| 2024/0078548 | A1 | 3/2024 | Kwak et al. | |
| 2024/0160229 | A1 | 5/2024 | Rana | |
| 2025/0139079 | A1* | 5/2025 | John | G06N 3/08 |

FOREIGN PATENT DOCUMENTS

CN 108429639 A 8/2018

OTHER PUBLICATIONS

International Search Report and Written Opinion for International Application No. PCT/US2025/033890 mailed Aug. 11, 2025.

* cited by examiner

*Primary Examiner* — Md Azad
(74) *Attorney, Agent, or Firm* — K&L Gates LLP

(57) ABSTRACT

A system for autonomously generating an implementing a machine executable file is disclosed herein. The system can include a node and an artificial intelligence generated machine executable ("AGMX") platform communicatively coupled to the node. The AGMX platform can include a control circuit and a memory to store an artificial intelligence model that, when executed by the control circuit, causes the AGMX platform to receive a user input including an objective, generate an instruction for the node to execute based on the objective, determine a management authority protocol to be assigned to the node, wherein the management authority protocol defines an ability of the node to deviate from the instruction, generate an AGMX file including the instruction and the management authority protocol, wherein the AGMX file is to be executed by the node, and transmit the AGMX file to the node for execution by the node.

20 Claims, 8 Drawing Sheets

302_a – Zero Variance, Full Executable
302_b – Vector and Path Variance
302_c – Objective Change Options
302_d – Physical Obstruction (Resolve)
302_e – Executable Plan (revise)
302_f – Multiple Target, New Protocols
302_g – Full Mission Revision/Control
302_h – Command AI Overwrite Capability

400

402 — {
402$_a$ – Zero Variance, Full Executable
402$_b$ – Vector and Path Variance
402$_c$ – Objective Change Options
402$_d$ – Physical Obstruction (Resolve)
402$_e$ – Executable Plan (revise)
402$_f$ – Multiple Target, New Protocols
402$_g$ – Full Mission Revision/Control
402$_h$ – Command AI Overwrite Capability

112

114$_b$

114$_b$

116$_c$

116$_b$

116$_a$

600

602
Train the model

604
Generate one or more tokens based on user input

606
Embed tokens into vectors

608
Process input embeddings through encoder layers

610
Generate contextual representations

612
Initiate code generation by processing next token

614
Generate the next token in the code sequence

616
End-of-sequence?

N

Y

618
Convert sequence of tokens into readable code

700

702
Receive sensor data from one or more sensors

704
Identify an action based on the sensor data

706
Determine a protocol associated with the action

708
Compliance with protocol?

N

710
Generate remedial action to resolve non-compliance

Y

712
Instruction or objective accomplished?

N

Y

714
Terminate node activity

708

802
Train the algorithm

804
Predict probabilities

806
Establish a threshold based on predicted probabilities

808
Evaluate node performance based on sensor data

809
Positive classification?

Y       N

810
Adjust the threshold

812
Cross-validate and fine tune the algorithm

DEVICES, SYSTEMS, AND METHODS FOR AUTONOMOUSLY GENERATING AND IMPLEMENTING MACHINE EXECUTABLE FILES

FIELD

The present disclosure is generally related to artificial intelligence and, more particularly, is directed to the use of artificial intelligence to autonomously generate machine executable instructions to be implemented via an objective-oriented machine.

SUMMARY

In some aspects, the present disclosure is directed to a system for autonomously generating an implementing a machine executable file. The system can include a node and an artificial intelligence generated machine executable ("AGMX") platform communicatively coupled to the node, wherein the AGMX platform includes a control circuit and a memory to store an artificial intelligence ("AI") model that, when executed by the control circuit, causes the AGMX platform to: receive a user input including an objective; generate an instruction for the node to execute based on the objective; determine a management authority protocol to be assigned to the node, wherein the management authority protocol defines an ability of the node to deviate from the instruction; generate an AGMX file including the instruction and the management authority protocol, wherein the AGMX file is to be executed by the node; and transmit the AGMX file to the node for execution by the node.

In other non-limiting aspects, the present disclosure is directed to an artificial intelligence generated machine executable ("AGMX") platform for autonomously generating an implementing a machine executable file. The AGMX platform can include a control circuit and a memory to store an artificial intelligence ("AI") model that, when executed by the control circuit, causes the AGMX platform to: receive a user input including an objective; generate an instruction for a node to execute based on the objective; determine a management authority protocol to be assigned to the node, wherein the management authority protocol defines an ability of the node to deviate from the instruction; generate an AGMX file including the instruction and the management authority protocol, wherein the AGMX file is to be executed by the node; and transmit the AGMX file to the node for execution by the node.

In still other non-limiting aspects, the present disclosure is directed to a method for autonomously generating an implementing a machine executable file. The method can include receiving, via a control circuit, a user input including an objective; generating, via the control circuit, an instruction for a node to execute based on the objective; determining, via the control circuit, a management authority protocol to be assigned to the node, wherein the management authority protocol defines an ability of the node to deviate from the instruction; generating, via the control circuit, an AGMX file including the instruction and the management authority protocol, wherein the AGMX file is to be executed by the node; transmitting, via the control circuit, the AGMX file to the node for execution by the node; and receiving sensor data from the node based on execution of the AGMX file by the node.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

Corresponding reference characters indicate corresponding parts throughout the several views. The exemplifications set out herein illustrate various aspects of the invention, in one form, and such exemplifications are not to be construed as limiting the scope of the invention in any manner.

DETAILED DESCRIPTION

Figure 1:
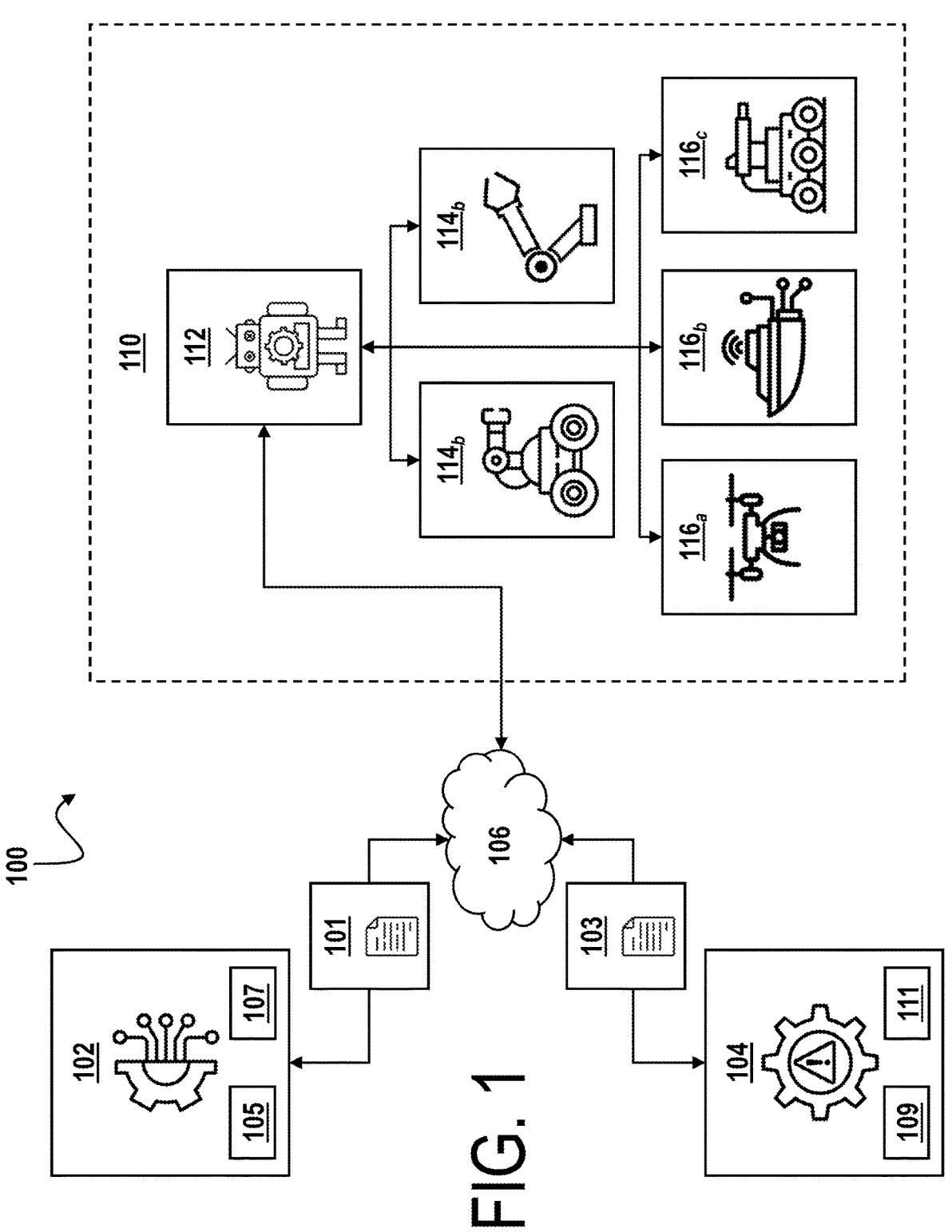
FIG. 1 illustrates a block diagram of a system for autonomously generating and implementing machine executable files, in accordance with at least one non-limiting aspect of the present disclosure.

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims. Furthermore, it is to be understood that such terms as "forward", "rearward", "left", "right", "upwardly", "downwardly", and the like are words of convenience and are not to be construed as limiting terms.

As used herein, a "platform" shall include an environment where software is executed. A platform can include the hardware, operating systems, and associated application programming interfaces, or other underlying software. A platform can include a control circuit (e.g., such as a processor, microprocess, or logic-based device, such as an application specific integrated circuit, as well as a memory configured to store software and/or instructions to be executed by the control circuit. A platform can provide the infrastructure and thus, foundation on which the devices, systems, and methods disclosed herein can be implemented to provide digital services, applications, and data processing functionality. It shall be appreciated that, according to some non-limiting aspects, a platform can include a client-server architecture, utilized to establish the requisite technical relationships between cooperating programs and for the deployment of a distributed application.

Before explaining various aspects of the devices, systems, and methods for establishing a fluidic connection with a gender agnostic actuator, it should be noted that the illustrative examples are not limited in application or use to the details disclosed in the accompanying drawings and description. It shall be appreciated that the illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof.

Autonomous robots are increasingly used in various industries, including manufacturing, healthcare, defense, and home services. However, conventional robots tend to specialize in predetermined tasks that could require significant human supervision if environmental conditions and/or other circumstances necessitate alteration of the predetermined task or alteration of a predetermined means of accomplishing a predetermined task. For example, conventional robots can struggle to adjust to unforeseen circumstances due to inherent limitations in their design, programming, and/or technological capabilities. As an initial matter, conventional robots operate on pre-defined rules and algorithms, following specific instructions that do not account for every possible variation or unexpected event in the real world. When faced with situations outside their programmed scenarios, conventional robots cannot adapt effectively. Additionally, conventional robots may be limited by certain hardware constraints. For example, a single robot operating alone is limited by sensor input provided by a limited number of onboard sensors, which may be further limited in terms of range, resolution, and the types of data they can perceive. Similarly, onboard processing limitations may limit conventional robots to narrow artificial intelligence ("AI") designed for specific tasks, lacking general artificial intelligence ("AGI"), which would allow such robots from understanding, learning, and applying knowledge across different contexts in a human-like manner. Conventional robots, therefore, are generally incapable of making real-time decisions, which further prevents them from adapting to unforeseen circumstances based on new and potentially ambiguous information. Furthermore, conventional robots operate at lower levels of autonomy, relying on human supervision or intervention for complex decisions. Higher levels of autonomy, which would enable better adjustment to unforeseen circumstances, are still in the research and development stages and present risks related to excessive autonomy without governance, monitoring, or compliance to predefined protocols.

Accordingly, there is a need for devices, systems, and methods, for autonomously generating and implementing machine executable files. Such devices, systems, and methods would enable a robot to utilize the processing power and sophisticated algorithms needed to make such decisions quickly and accurately. For example, such devices, systems, and methods could be implemented to generate and modify machine executable files based on sensor inputs generated by a variety of different sensors deployed across a fleet of robots. Such machine executable files can be generated and modified by a remotely stored artificial intelligence, as disclosed herein, configured to enforce a predetermined set of rules to ensure each robot of the fleet is capable of safely and efficiently accomplishing a predetermined task. Collectively, the devices, systems and methods disclosed herein can both generate and process large amounts of data and implement extensive training to ensure a robot improves its performance over time, by enhancing its contextual understanding of an environment and/or circumstances associated with a predetermined task.

Referring now to FIG. 1, a block diagram of a system 100 configured to autonomously generate and implement machine executable files is depicted according to at least one non-limiting aspect of the present disclosure. According to the non-limiting aspect of FIG. 1, the system 100 can include an artificial intelligence generated machine executable ("AGMX") platform 102, a risk management platform 104, and a plurality of nodes 112, $114_a$, $114_b$, $116_a$, $116_b$, $116_c$, configured to operate in an operating environment 110. The AGMX platform 102 can include a control circuit 105 and a memory 107 configured to store an algorithm (e.g., an AI model) that, when executed by the control circuit 105, causes the AGMX platform 102 to perform the functionality described herein. Likewise, the risk management platform 104 can include a control circuit 109 and a memory 111 configured to store an algorithm (e.g., an AI model) that, when executed by the control circuit 109, causes the AGMX platform 102 to perform the functionality described herein.

Although the system 100 of FIG. 1 illustrates six nodes 112, $114_a$, $114_b$, $116_a$, $116_b$, $116_c$, it shall be appreciated that, according to other non-limiting aspects, the system 100 can include a single node or any number of nodes necessary to accomplish a particular objective. The AGMX platform 102, risk management platform 102, and plurality of nodes 112, $114_a$, $114_b$, $116_a$, $116_b$, $116_c$, can include transceivers, transmitters, and/or receivers configured to communicate data via one or more communication networks 106. For example, the one or more communication networks 106 can include a cellular network (e.g., 3G, LTE, 5G, etc.), a wireless infrastructure network (e.g., WiFi, WLAN, etc.), a wired infrastructure network (e.g., LAN, DSL, fiberoptic, etc.), an ad hoc network (e.g., Bluetooth, NFC, Zigbee, etc.), a private network (e.g., an intranet, etc.), a public network (e.g., the Internet, etc.) and/or any combinations thereof. For example, the AGMX platform 102 can be configured to generate and transmit an AGMX file 101 that includes instructions to be executed by the plurality of nodes 112, $114_a$, $114_b$, $116_a$, $116_b$, $116_c$, via the communications network 106. Likewise, the risk management platform 104 can be configured to receive sensor feedback from the plurality of nodes 112, $114_a$, $114_b$, $116_a$, $116_b$, $116_c$, via the communications network 106 and can generate and transmit monitoring commands via the communications network 106.

According to some non-limiting aspects, a single AGMX file 101 can include instructions for each of the plurality of nodes 112, $114_a$, $114_b$, $116_a$, $116_b$, $116_c$, and can be distributed to each of the plurality of nodes 112, $114_a$, $114_b$, $116_a$, $116_b$, $116_c$. According to other non-limiting aspects, separate AGMX files 101 can be generated with instructions for each node of the plurality of nodes 112, $114_a$, $114_b$, $116_a$, $116_b$, $116_c$, and can be separately transmitted to each node of the plurality of nodes 112, $114_a$, $114_b$, $116_a$, $116_b$, $116_c$. As such, the AGMX platform 102 can transmit one or more AGMX files 101 to the designated control node for distribution to the remaining nodes of the the plurality of nodes 112, 114$_a$, 114$_b$, 116$_a$, 116$_b$, 116$_c$.

Still referring to FIG. 1, the plurality of nodes 112, 114$_a$, 114$_b$, 116$_a$, 116$_b$, 116$_c$, can include machines (e.g., vehicles, robots, industrial equipment, etc.) configured to autonomously execute instructions received from the AGMX platform 102 within the operating environment 110. By way of example, the present disclosure will describe a non-limiting aspect wherein the operating environment 110 includes a factory. However, it shall be appreciated that, according to other non-limiting aspects, the environment 110 can include a construction site, a battlefield, an office, outer space, under water, and/or any other environment in which it might useful to autonomously deploy and utilize the plurality of nodes 112, 114$_a$, 114$_b$, 116$_a$, 116$_b$, 116$_c$. The specific structure of at least one node of the plurality of nodes 112, 114$_a$, 114$_b$, 116$_a$, 116$_b$, 116$_c$. will be described in further detail with reference to FIG. 2. However, it shall be appreciated that the plurality of nodes 112, 114$_a$, 114$_b$, 116$_a$, 116$_b$, 116$_c$ are configured to receive AGMX files 101 received from the AGMX platform 102. However, as depicted in FIG. 1, it shall be appreciated that each of the plurality of nodes 112, 114$_a$, 114$_b$, 116$_a$, 116$_b$, 116$_c$ may include different robots with differing capabilities. For example, a first node 112 may be a land-based robot, a second node 114$_a$ may be an air-based robot, and a third node 114$_c$ may be water-based robot. Other nodes of the plurality of nodes 112, 114$_a$, 114$_b$, 116$_a$, 116$_b$, 116$_c$ may be stationary, be outfitted with different tools, or have different processing capabilities or permissions.

According to the non-limiting aspect of FIG. 1, the AGMX platform 102 can include a server, including a control circuit and/or a memory to store an artificial intelligence model configured to cause the control circuit to generate an AGMX file 101. According to some non-limiting aspects, the AGMX platform 102 can be remotely located relative to the operating environment 110. The AGMX file 101 can include one or more instructions to be executed by one or more of the plurality of nodes 112, 114$_a$, 114$_b$, 116$_a$, 116$_b$, 116$_c$ in order to accomplish a user-defined objective. For example, according to the non-limiting example wherein the operating environment 110 is a factory, the AGMX file 101 might include one or more instructions for one or more of the plurality of nodes 112, 114$_a$, 114$_b$, 116$_a$, 116$_b$, 116$_c$. to accomplish an objective of moving a box from a first location to a second location. Although the details of the artificial intelligence model will be described in further detail with reference to FIG. 4, it shall be appreciated that the AGMX platform 102 can employ any suitable model to generate the AGMX file 101, including a reinforcement learning model (e.g., Q-learning, Deep Q-learning, policy gradient, etc.), a sequence-to-sequence model (e.g., recurrent neural network, transformers, etc.), a computer vision model (e.g., convolutional neural network, object detection, etc.), and/or a natural language processing model (e.g., bidirectional encoder representations from transformers, ChatGPT, etc.), or combinations thereof.

In further reference to FIG. 1, at least one of the plurality of nodes 112, 114$_a$, 114$_b$, 116$_a$, 116$_b$, 116$_c$, can include a localized AI engine communicably coupled to the AGMX platform 102 and configured to ensure the AGMX file 101 is executed by at least one node of the plurality of nodes 112, 114$_a$, 114$_b$, 116$_a$, 116$_b$, 116$_c$. For example, a first node 112 of the plurality can be configured to function as a localized AI engine control node, having been granted certain permissions to command the remaining nodes 114$_a$, 114$_b$, 116$_a$, 116$_b$, 116$_c$. of the plurality. For example, although the system 100 may be configured with more than one control node, at least one of the remaining nodes 114$_a$, 114$_b$, 116$_a$, 116$_b$, 116$_c$, of the plurality can be configured to function as a sub-node subservient to the first node 112. According to some non-limiting aspects, the AGMX file 101 may include a predetermined set of instructions for each of the plurality of nodes 112, 114$_a$, 114$_b$, 116$_a$, 116$_b$, 116$_c$, and the first node 112, or control node, can ensure execute its own instructions and distribute the remaining instructions to the remaining nodes 114$_a$, 114$_b$, 116$_a$, 116$_b$, 116$_c$. of the plurality, monitoring each of the remaining nodes 114$_a$, 114$_b$, 116$_a$, 116$_b$, 116$_c$. to ensure successful execution of each of the instructions. However, according to some non-limiting aspects, the AGMX file 101 may simply include the objective, or a subset of instructions and a localized AI engine of the first node 112 can generate one or more sub-node AGMX ("SAGMX"") files to be transmitted to one or more of the sub-nodes 114$_a$, 114$_b$, 116$_a$, 116$_b$, 116$_c$, based on the AGMX file 101. It shall be appreciated that, in similar fashion, a hierarchy of any number of levels can be established amongst the plurality of nodes 112, 114$_a$, 114$_b$, 116$_a$, 116$_b$, 116$_c$. With each node being assigned certain permissions in accordance with its role in the hierarchy. For example, each of the plurality of nodes can 112, 114$_a$, 114$_b$, 116$_a$, 116$_b$, 116$_c$, autonomously operate according to one or more management authority protocols, as will be discussed in further detail with specific reference to FIG. 2.

As will be described in further detail with reference to FIG. 2, at least one of the plurality of nodes 112, 114$_a$, 114$_b$, 116$_a$, 116$_b$, 116$_c$, of the system 100 of FIG. 1 can include a sensor configured to generate sensor data, which can be used either by the localized AI engine of the first node 112 or the AGMX platform 102 as secondary stimuli or feedback to monitor and/or modify completion of the objective. Based on secondary stimuli, the AGMX platform 102 can generate a second AGMX file for subsequent execution by the plurality of nodes can 112, 114$_a$, 114$_b$, 116$_a$, 116$_b$, 116$_c$. According to some non-limiting aspects and depending on the permissions granted to the first node 112 by the initial AGMX file 101, the localized AI engine of the first node 112 may generate the second AGMX file based on the aforementioned secondary stimuli. For example, one or more nodes of the plurality of nodes 112, 114$_a$, 114$_b$, 116$_a$, 116$_b$, 116$_c$, may include a sensor, such as a proximity sensor (e.g., an infrared sensor, an ultrasonic sensor, etc.), a position sensor (e.g., a GPS sensor, etc.), a vision sensor (e.g., a camera, a LIDAR, a RADAR, etc.), an inertial measurement unit (e.g., an accelerometer, a gyroscope, a magnetometer, etc.), an environmental sensor (e.g., a temperature sensor, a humidity sensor, a gas sensor, etc.), a sound sensor (e.g., a microphone, etc.), and/or an optical sensor (e.g., a photodiode, a photoresistor, etc.). The sensor data, for example, can be indicative of a parameter (e.g., an obstacle, an environmental condition, a node condition, a target object condition, etc.) that may affect the completion of the objective. As will be described in further detail with reference to FIG. 3, if the sensing node of the plurality of nodes 112, 114$_a$, 114$_b$, 116$_a$, 116$_b$, 116$_c$, is designated a control node (e.g., constitutes a localized AI engine) or is otherwise authorized to deviate from the explicit instructions provided by the initial AGMX file 101 according to a management authority protocol, the sensing node may modify the instructions provided by the initial AGMX file 101 to account for the sensed parameter. Otherwise, the sensing node of the plurality of nodes 112, 114$_a$, 114$_b$, 116$_a$, 116$_b$, 116$_c$, can generate a request for a modified AGMX file 103 that accounts for the sensed parameter, from the AGMX platform 102 or another system 100 component (e.g., the control node, the localized AI engine, the risk management platform 104, etc.) that is authorized to generate the modified AGMX file 103.

For example, if the initial AGMX file 101 of the system 100 of FIG. 1 included instructions to move a box from a first location to a second location, but one of the plurality of nodes 112, 114$_a$, 114$_b$, 116$_a$, 116$_b$, 116$_c$, generated sensor data indicating that it was obstructed by a forklift parked in an unexpected location. Alternately, the sensor data may indicate that one of the plurality of nodes 112, 114$_a$, 114$_b$, 116$_a$, 116$_b$, 116$_c$, is damaged, out of power, or otherwise incapacitated. According to other non-limiting aspects, the sensor data may indicate that a target object (e.g., the box) has been damaged. Regardless, based on the generated sensor data, the AGMX platform 102 may generate a modified AGMX file 103 with modified instructions, such that the obstructed node can proceed. According to other non-limiting aspects, the protocols may designate the first node 112 a control node permitted to monitor execution of the AGMX file 101 and generate a modified AGMX files 103 and/or an SAGMX file to ensure a successful completion of the objective. For example, based on sensor data from a vision sensor and GPS sensor, the first node 112 may determine that, although a second node 114$_a$ is in possession of the box, the second node 114$_a$ is not in the second location and therefore, the first node 112 may generate an SAGMX file commanding the second node to either take an alternate route, or transfer the box to a third node 114$_b$, which may have different capabilities than the second node 114$_a$. As will be described in further detail herein, the risk management platform 104 can enforce the protocols. In other words, the sensor data can be used by the AGMX platform 102, the risk management platform 103, and/or the localized AI engine (e.g., a control node) to dynamically update the machine-executable instructions in response to circumstances unaccounted for in the initial AGMX file 101, thereby ensuring successful completion of the objective.

The risk management platform 104 of the system 100 of FIG. 1 can be configured to store and execute a protocol rules engine that monitors the behavior of the plurality of nodes 112, 114$_a$, 114$_b$, 116$_a$, 116$_b$, 116$_c$, via sensor data and/or received signals to ensure each of the remaining nodes 114$_a$, 114$_b$, 116$_a$, 116$_b$, 116$_c$, are complying with the applicable management authority protocols. According to some non-limiting aspects, the risk management platform 104 can be positioned locally relative to the plurality of nodes 112, 114$_a$, 114$_b$, 116$_a$, 116$_b$, 116$_c$. According to other non-limiting aspects, the risk management platform 104 can be positioned remotely relative to the plurality of nodes 112, 114$_a$, 114$_b$, 116$_a$, 116$_b$, 116$_c$. It shall be appreciated that, aside from receiving sensor data and/or other signals from the plurality of nodes 112, 114$_a$, 114$_b$, 116$_a$, 116$_b$, 116$_c$, the risk management platform 104, via the communication network 106, can be configured to send instructions and/or commands directly to the plurality of nodes 112, 114$_a$, 114$_b$, 116$_a$, 116$_b$, 116$_c$, or to the operating environment 110 and infrastructure therein. These instructions and/or commands can include the modified AGMX file 103, which may cause the plurality of nodes 112, 114$_a$, 114$_b$, 116$_a$, 116$_b$, 116$_c$, to alter their behavior within the operating environment, power down, and/or disable or enable certain components of the node architecture, which will be described in further detail with reference to FIG. 2. Additionally, the instructions and/or commands sent by the risk management platform 104 can be configured to alter operations of various infrastructure within the operating environment 110, including shutting of electrical power, closing door and/or windows, and/or actuating and obstacle or barrier within the operating environment 110, amongst others.

The risk management platform 104—and specifically, the protocol rules engine—can react to sensor inputs (e.g., visual, physical, ambient, sonic, etc.) and based on those sensor inputs, can monitor the plurality of nodes 112, 114$_a$, 114$_b$, 116$_a$, 116$_b$, 116$_c$. The sensor inputs can be generated either by the plurality of nodes 112, 114$_a$, 114$_b$, 116$_a$, 116$_b$, 116$_c$, or a sensor coupled to the risk management platform 104, itself. As will be described in further detail with reference to FIG. 3, the protocol rules engine can ensure that the plurality of nodes 112, 114$_a$, 114$_b$, 116$_a$, 116$_b$, 116$_c$, are operating in accordance with an applicable protocol. In other words, risk management platform 104 enforces the management authority protocols.

It shall be appreciated that there is an inherent benefit to including a separate risk management platform 104 in system 100 because separating the monitoring functions from the implementing functions performed by the AGMX platform 102 and/or plurality of nodes 112, 114$_a$, 114$_b$, 116$_a$, 116$_b$, 116$_c$, because it provides a separate layer of communication and process cancellation and/or modification. This imbues the system 100 with "checks and balances" and therefore, greater security. However, according to other non-limiting aspects, either the AGMX platform 102 or a localized AI engine can store and execute the protocol rules engine. According to still other non-limiting aspects, the first node 112, or control node not only reads and executes AGMX files 101 received from the AGMX platform, but can be configured with a protocol rules engine to monitor the behavior of the remaining nodes 114$_a$, 114$_b$, 116$_a$, 116$_b$, 116$_c$, to ensure each of the remaining nodes 114$_a$, 114$_b$, 116$_a$, 116$_b$, 116$_c$, is complying with the applicable management authority protocols. Regardless, it shall be appreciated that the system 100 of FIG. 1 can include a protocol rules engine configured to perform the functionality attributed herein to the risk management platform 104.

Figure 2:
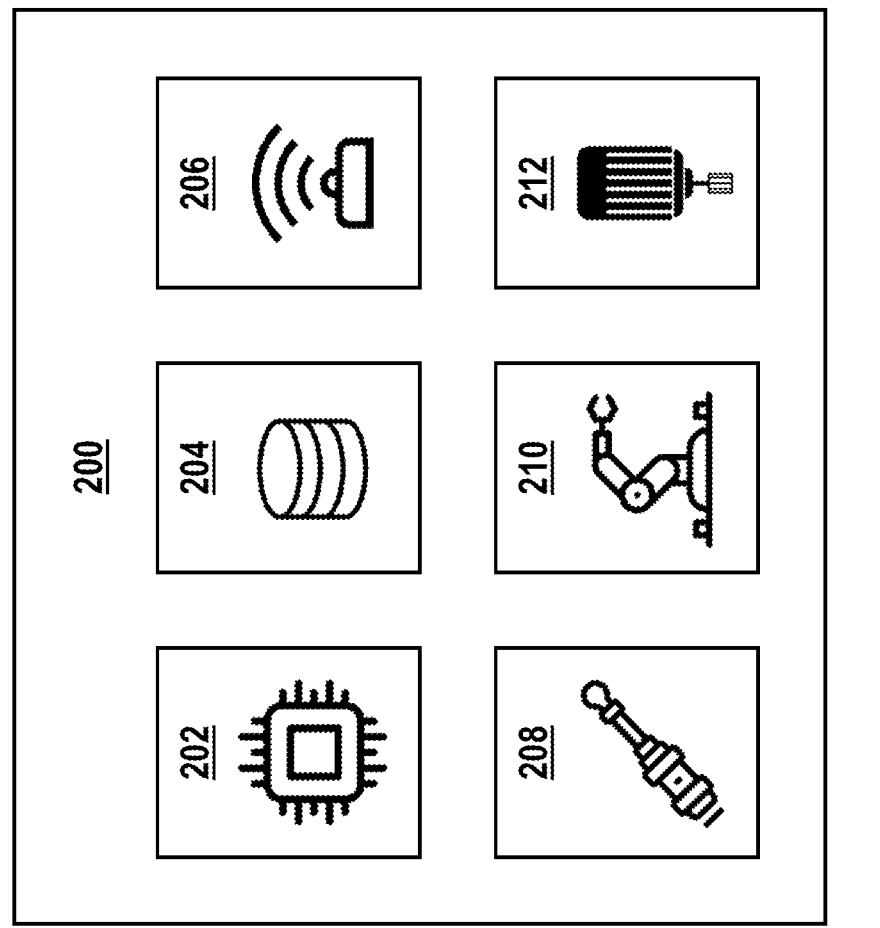
FIG. 2 illustrates a block diagram of an exemplary node of the plurality of nodes of the system of FIG. 1, in accordance with at least one non-limiting aspect of the present disclosure.

Referring now to FIG. 2, a block diagram of an exemplary node 200 of the plurality of nodes 112, 114$_a$, 114$_b$, 116$_a$, 116$_b$, 116$_c$, of the system 100 of FIG. 1 is depicted according to at least one non-limiting aspect of the present disclosure. According to the non-limiting aspect of FIG. 2, the node 112 can include a control circuit 202, a memory 204, one or more sensors 206, one or more actuators 208, one or more tools 210, and/or a mobility system 212, amongst other components. Upon receipt, the node 200 may store the AGMX file 101 (FIG. 1) in the memory 204. The AGMX file 101 (FIG. 1) can be specifically configured by the AGMX platform 102 (FIG. 1) to cause the control circuit 202 to cause the node 200 to execute a set of instructions in accordance with a set of management authority protocols. As previously discussed, the set of instructions and management authority protocols can be programmed into the AGMX file 101 (FIG. 1) such that the node 200 and/or plurality of nodes 112, 114$_a$, 114$_b$, 116$_a$, 116$_b$, 116$_c$, (FIG. 1) can complete a user-defined objective based on one or more user inputs received by the AGMX platform 102 (FIG. 1). The control circuit 202, of course, can be configured to control other aspects of the node 200, including the one or more sensors 206, the one or more actuators 208, the one or more tools 210, and/or the mobility system 212, often in response to one or more instructions in the AGMX file 101 (FIG. 1). According to the non-limiting aspect wherein the node 200 is designated a control node, the localized AI engine can be stored in the memory 204 and executed by the control circuit 202.

According to other non-limiting aspects, the protocol rules engine can be stored in the memory 204 and executed by the control circuit 202.

In further reference of FIG. 2, the one or more sensors 206 can include a proximity sensor (e.g., an infrared sensor, an ultrasonic sensor, etc.), a position sensor (e.g., a GPS sensor, etc.), a vision sensor (e.g., a camera, a LIDAR, a RADAR, etc.), an inertial measurement unit (e.g., an accelerometer, a gyroscope, a magnetometer, etc.), an environmental sensor (e.g., a temperature sensor, a humidity sensor, a gas sensor, etc.), a force or pressure sensor, a sound sensor (e.g., a microphone, etc.), and/or an optical sensor (e.g., a photo-diode, a photoresistor, etc.), amongst others. However, it shall be appreciated that the one or more sensors 206 can include any sensor configured to generate a desired type of sensor data in accordance with user preference and/or intended application. The sensor data, for example, can be generated to characterize one or more parameters (e.g., an obstacle, an environmental condition, a node condition, a target object condition, etc.) associated with the node's ability to contribute towards completion of the objective.

Still referring to FIG. 2, the one or more actuators 208 can be configured to be actuated by the control circuit 202 to move various aspects of the node 200, such as the one or more sensors 206 and/or the one or more tools 210. The one or more actuators 208, for example, can include an electric actuator (e.g., a direct current motor, an alternating current motor, a stepper motor, a servo motor, etc.), a pneumatic actuator, a hydraulic actuator, a piezoelectric actuator, a shape memory alloy, and/or a magnetic actuator, amongst others. In other words, the one or more actuators 208 can have its own advantages, including different precisions, speeds, forces, and size constraints, and may be selected based on the specific objective, or the node's 200 intended contribution towards completing the objective.

According to the non-limiting aspect of FIG. 2, the one or more tools 210 can include a gripper (e.g., a parallel gripper, a vacuum gripper, a magnetic gripper, etc.), a cutting tool (e.g., a laser cutter, a plasma cutter, a water jet cutter, etc.), a painting and/or coating tool (e.g., a spray gun, etc.), a material handling tool (e.g., a conveyor, a palletizer, a depalletizer, etc.), a measurement and/or inspection tool (e.g., a vision system, a laser scanner, etc.), a drilling and/or milling tool (e.g., a drill head, a milling head, etc.), a sanding and/or polishing tool, a dispensing tool (e.g., a glue dispenser, a sealant dispenser, etc.), a medical tool (e.g., a surgical instrument, etc.), a welding tool (e.g., an arc welder, a spot welder, etc.), and/or a weapon (e.g., a gun, a knife, etc.), amongst others. It shall be appreciated that the plurality of nodes 112, $114_a$, $114_b$, $116_a$, $116_b$, $116_c$, (FIG. 1) may include different robots with differing capabilities. For example, according to one non-limiting aspect, the one or more tools 210 of the node 200 may be configured for material handling, whereas other nodes of the plurality of nodes 112, $114_a$, $114_b$, $116_a$, $116_b$, $116_c$, (FIG. 1) may have tools configured for gripping and/or cutting.

The mobility system 212 of the node 200 of FIG. 2, for example, can include any motor, engine, transmission, a propulsion system, wheels, wings, treads, air cushion, and/or propellers, amongst other means of moving the node 200 throughout the operating environment 110 according to user preference and/or intended application. Once again, it shall be appreciated that the plurality of nodes 112, $114_a$, $114_b$, $116_a$, $116_b$, $116_c$ (FIG. 1) may include different robots with differing capabilities. For example, according to one non-limiting aspect, the mobility system 212 can be configured such that the node 200 can traverse the land. According to other non-limiting aspects, the mobility system 212 can be configured such that the node 200 can traverse water or air. According to still other non-limiting aspects, the node 200 may be stationary and therefore, may exclude the mobility system 212 altogether. Thus, it shall be appreciated that, according to some non-limiting aspects, the node 200 may be capable of executing all instructions in an AGMX file 101 (FIG. 1) itself and therefore, exclusively capable of completing the objective. However, according to other non-limiting aspects, the instructions of the AGMX file 101 (FIG. 1) and its objective require a plurality of nodes 112, $114_a$, $114_b$, $116_a$, $116_b$, $116_c$, (FIG. 1) with varying capabilities in order to complete the objective.

According to the non-limiting aspect wherein the node 200 of FIG. 2 is designated a control node, the localized AI engine can utilize inputs from the one or more sensors 206—and sensor inputs from other nodes of the plurality of nodes 112, $114_a$, $114_b$, $116_a$, $116_b$, $116_c$, (FIG. 1)—to cause the control circuit 202 to generate modified AGMX files 103 (FIG. 1) and/or SAGMX files based on those inputs. According to the non-limiting aspect wherein a protocol rules engine is stored in the memory 204 of the node 200, the protocol rules engine can utilize inputs from the one or more sensors 206—and sensor inputs from other nodes of the plurality of nodes 112, $114_a$, $114_b$, $116_a$, $116_b$, $116_c$, (FIG. 1)—to cause the control circuit 202 to monitor other nodes from the plurality of nodes 112, $114_a$, $114_b$, $116_a$, $116_b$, $116_c$, (FIG. 1) and enforce the management authority protocols.

Figure 3:
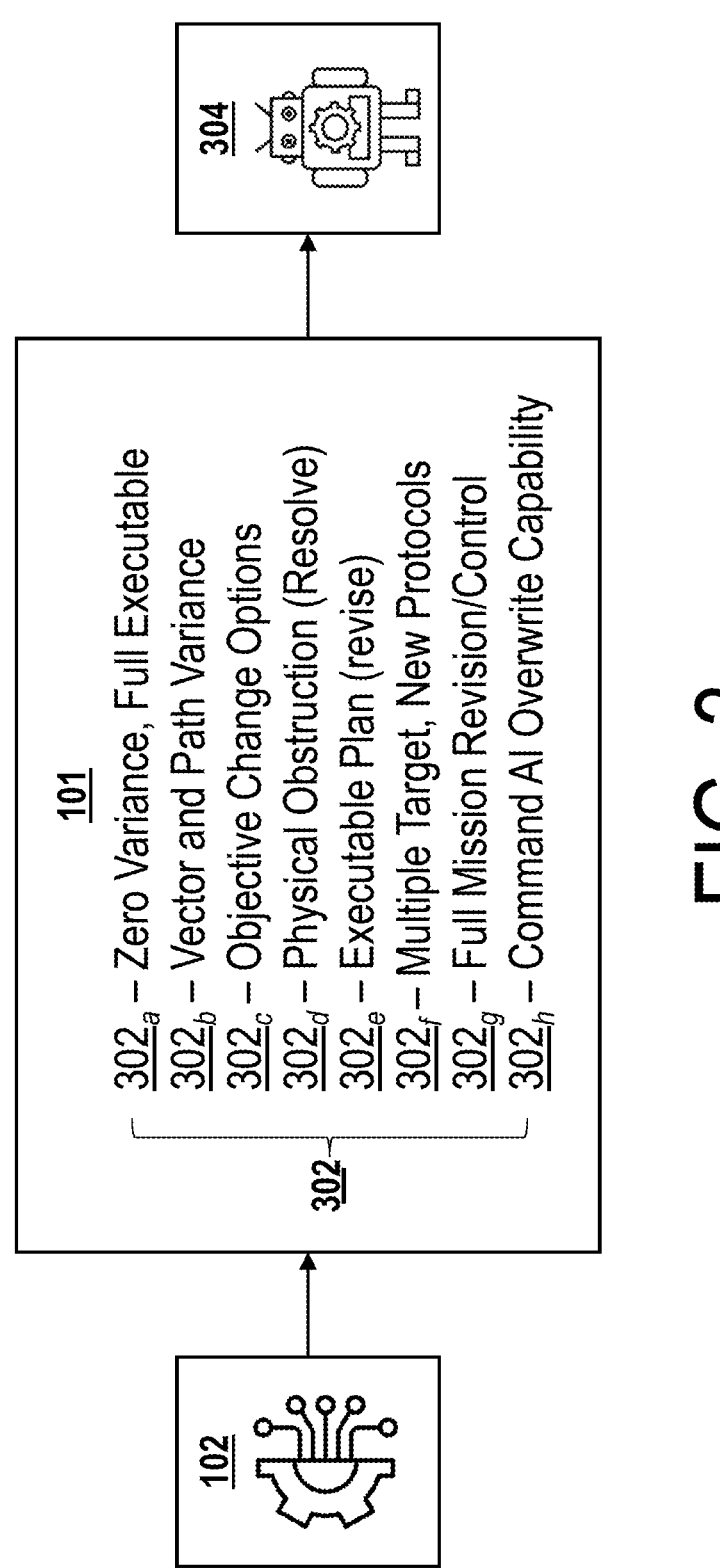
FIG. 3 illustrates a simplified block diagram of an autonomously generated machine executable file generated by the artificial intelligence generated machine executable platform of the system of FIG. 1 in accordance with at least one non-limiting aspect of the present disclosure.

Referring now to FIG. 3, a simplified block diagram of the AGMX file 101 generated by the AGMX platform 102 of the system 100 of FIG. 1 is depicted according to at least one non-limiting aspect of the present disclosure. According to the non-limiting aspect of FIG. 3, the AGMX file 101 can include a plurality of management authority protocols 302, which may be assigned to a selected node 304 enforced by the risk management platform 104 or, according to some non-limiting aspects, a local AI engine (e.g., a control node) or the AGMX platform 102 itself. The plurality of management authority protocols 302 can govern how the selected node 304 can operate throughout the operating environment 110 (FIG. 1), respond to sensor inputs, relate to other nodes of the plurality of nodes 112, $114_a$, $114_b$, $116_a$, $116_b$, $116_c$, execute its instructions, and/or complete its objective. For example, as previously described, it may be preferable to designate selected node 304 as a control node (e.g., constitutes a localized AI engine) or grant the selected node 304 limited permissions to deviate from the explicit instructions provided by the initial AGMX file 101. This can be achieved via the plurality of management authority protocols 302.

For example, when a first management authority protocol $302_a$ of FIG. 3 is applied, a selected node 304 may be limited to executing the applicable instructions assigned via the AGMX file 101. A second management authority protocol $302_b$ may enable a selected node 304 to execute applicable instructions prescribed by the AGMX file 101 subject to certain vector and/or path variances. In other words, the second management authority protocol $302_b$ may allow the selected node 304 to change course based on sensor data if, for example, it senses an obstacle preventing it from completing the instructions. A third management authority protocol $302_c$ may enable a selected node 304 to change its specific objective, as prescribed by the AGMX file 101. A fourth management authority protocol $302_d$ may enable a selected node 304 to resolve a physical obstruction, for example, by utilizing its one or more tools 210 (FIG. 2). A fifth management authority protocol $302_e$ may enable a selected node 304 to revise its executable plan. A sixth management authority protocol $302_f$ may enable a selected node 304 to assign a new protocol to multiple targets and a seventh management authority protocol $302_g$ may enable a selected node 304 to revise and/or control the entire objective, as dictated by the AGMX file 101 in response to the user input. Finally, an eighth management authority protocol $302_h$ may enable a selected node 304 to revise and/or control the entire objective, as dictated by the AGMX file 101 in response to the user input.

In other words, if the AGMX platform 102 decided to designate the selected node 304 a control node, the AGMX platform 102 may generate an AGMX file 101 that assigns the selected node 304 the eighth management authority protocol $302_h$. Thus, if the selected node 304 detected a parameter (e.g., an obstacle, an environmental condition, a node condition, a target object condition, etc.) based on sensor data and determined the parameter may affect the completion of the objective, the selected node 304 would have the proper permissions to generate a modified AGMX file 103 (FIG. 3) that accounts for the detected parameter. Other protocols $302_{b-g}$ of the plurality of management authority protocols 302 could enable the selected node 304 to account for the detected parameter in alternate ways. However, is assigned the first management authority protocol $302_a$, the selected node 304 would be incapable of autonomously accounting for the detected parameter and would have to await receipt of a modified AGMX file 103 (FIG. 1) or an SAGMX file from a control node, the AGMX platform 102, or the risk management platform 104. Moreover, the risk management platform 104 can enforce the plurality of management authority protocols 302 based on sensor data and can implement a risk management action upon determining that one of plurality of nodes 112, $114_a$, $114_b$, $116_a$, $116_b$, $116_c$ is not complying with the plurality of management authority protocols 302. The risk management action, for example, can include overriding the control circuit 202 (FIG. 2) of the non-compliant node, shutting the non-compliant node down, and/or disabling certain functions of the non-compliant node, amongst others.

Figure 4:
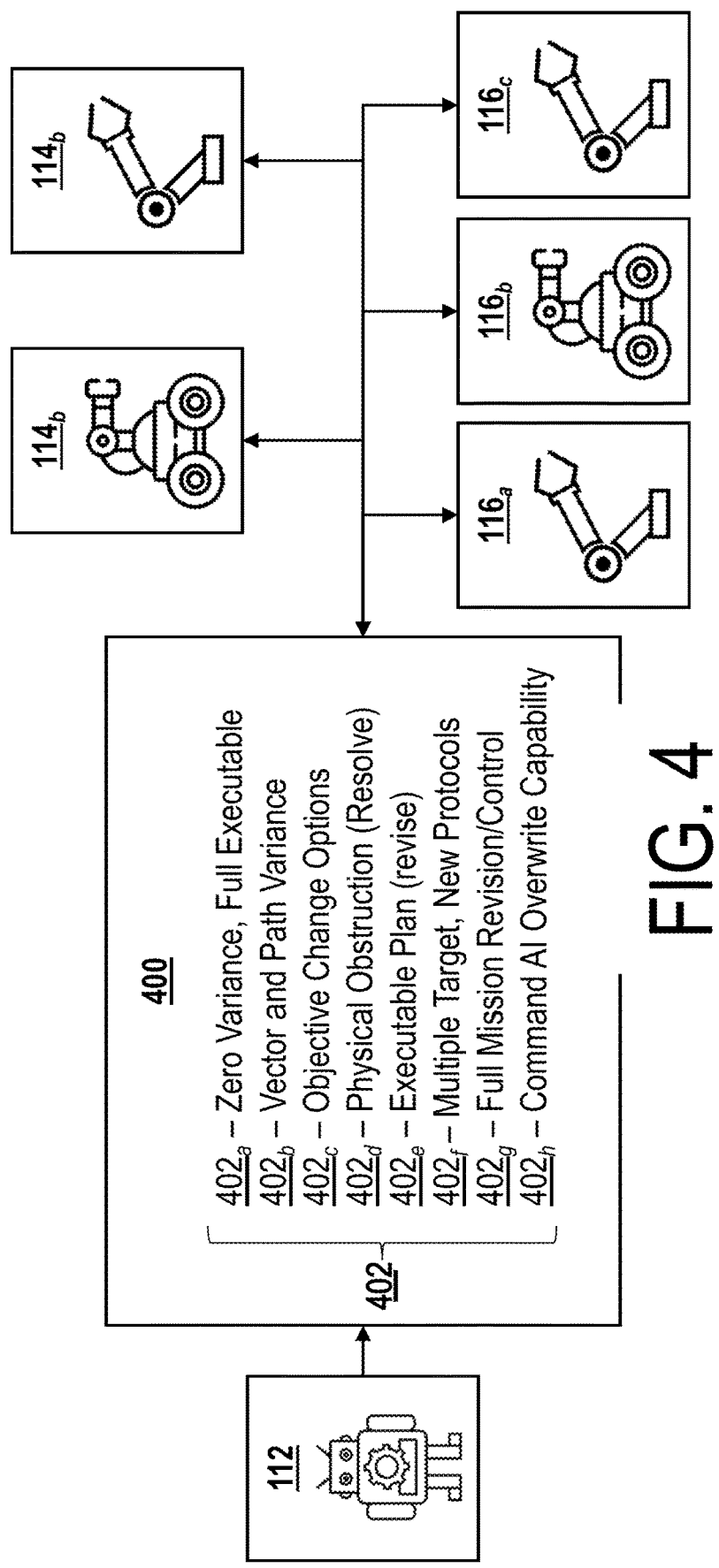
FIG. 4 illustrates a simplified block diagram of an autonomously generated machine executable file for a sub-node of the system of FIG. 1 in accordance with at least one non-limiting aspect of the present disclosure.

Referring now to FIG. 4, a simplified block diagram of an SAGMX file 400 generated by a control node of the system 100 of FIG. 1 is depicted according to at least one non-limiting aspect of the present disclosure. According to the non-limiting aspect of FIG. 4, the SAGMX file 400 can include a plurality of management authority protocols 402, which may be assigned to a selected node of a plurality of nodes 112, $114_a$, $114_b$, $116_a$, $116_b$, $116_c$ enforced by the risk management platform 104 or, according to some non-limiting aspects, a local AI engine (e.g., a control node) or the AGMX platform 102 itself. According to the non-limiting aspect of FIG. 4, the first node 112 of the plurality of nodes 112, $114_a$, $114_b$, $116_a$, $116_b$, $116_c$, has been designated a control node, meaning the first node 112 has been configured to store a local AI engine such that the first node 112 can perform, at least, a subset of the functionality ascribed to the AGMX platform 102. In other words, the first node 112 may be granted permissions pursuant to the aforementioned sixth management authority protocol $302_f$, seventh management authority protocol $302_g$, or eighth management authority protocol $302_h$, as previously described.

Accordingly, the first node 112 can generate one or more SAGMX files 400 that include one or more management authority protocols 402 that govern how the remaining nodes of the plurality of nodes 112, $114_a$, $114_b$, $116_a$, $116_b$, $116_c$, can operate throughout the operating environment 110 (FIG. 1), respond to sensor inputs, relate to other nodes of the plurality of nodes $114_a$, $114_b$, $116_a$, $116_b$, $116_c$, execute instructions, and/or complete their respective objectives. For example, when a first management authority protocol $402_a$ of FIG. 4 is applied, a selected node of the remaining nodes 112, $114_a$, $114_b$, $116_a$, $116_b$, $116_c$, may be limited to executing the applicable instructions assigned via the SAGMX file 400. A second management authority protocol $402_b$ may enable a selected node of the remaining nodes 112, $114_a$, $114_b$, $116_a$, $116_b$, $116_c$, to execute applicable instructions prescribed by the SAGMX file 400 subject to certain vector and/or path variances. In other words, the second management authority protocol $402_b$ may allow the selected node of the remaining nodes 112, $114_a$, $114_b$, $116_a$, $116_b$, $116_c$, to change course based on sensor data if, for example, it senses an obstacle preventing it from completing the instructions. A third management authority protocol 402, may enable a selected node of the remaining nodes 112, $114_a$, $114_b$, $116_a$, $116_b$, $116_c$, to change its specific objective, as prescribed by the SAGMX file 400. A fourth management authority protocol $402_d$ may enable a selected node of the remaining nodes 112, $114_a$, $114_b$, $116_a$, $116_b$, $116_c$, to resolve a physical obstruction, for example, by utilizing its one or more tools 210 (FIG. 2). A fifth management authority protocol $402_e$ may enable a selected node of the remaining nodes 112, $114_a$, $114_b$, $116_a$, $116_b$, $116_c$, to revise its executable plan. A sixth management authority protocol $402_f$ may enable a selected node of the remaining nodes 112, $114_a$, $114_b$, $116_a$, $116_b$, $116_c$, to assign a new protocol to multiple targets and a seventh management authority protocol $402_g$ may enable a selected node of the remaining nodes 112, $114_a$, $114_b$, $116_a$, $116_b$, $116_c$, to revise and/or control the entire objective, as dictated by the SAGMX file 400 in response to the user input. Finally, an eighth management authority protocol $402_h$ may enable a selected node of the remaining nodes 112, $114_a$, $114_b$, $116_a$, $116_b$, $116_c$, to revise and/or control the entire objective, as dictated by the SAGMX file 400 in response to the user input.

Figure 5:
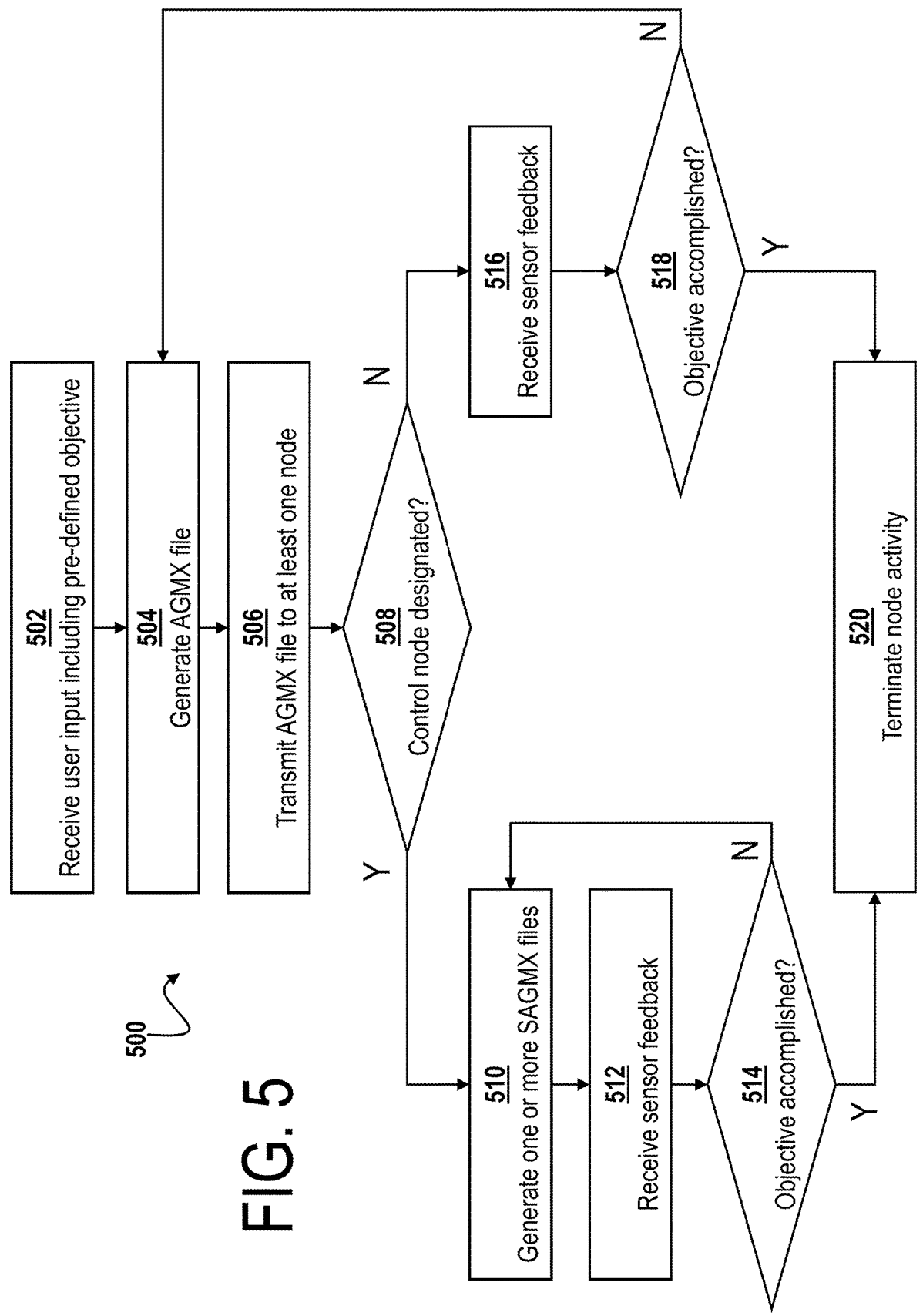
FIG. 5 illustrates an algorithmic flow diagram of a method for autonomously generating and implementing machine executable files, in accordance with at least one non-limiting aspect of the present disclosure.

Referring now to FIG. 5, an algorithmic flow diagram of a method 500 for autonomously generating and implementing machine executable files is depicted according to at least one non-limiting aspect of the present disclosure. It shall be appreciated that the method 500, for example, can be performed by any of the control circuits described herein, including the control circuit 105 (FIG. 1) of the AGMX platform 102 (FIG. 1) of the system 100 of FIG. 1. The control circuits, for example, can be configured to perform the method 500 in response to instructions provided by an algorithm—or AI model—that can be stored in any of the memories described herein, including the memory 107 (FIG. 1) of the AGMX platform 102 (FIG. 1) of the system 100 of FIG. 1. According to other non-limiting aspects, the method 500 can be stored in a memory 204 (FIG. 2) and performed by the control circuit 202 (FIG. 2) of a designated control node, or any other AI engine that is local to the operating environment 110 (FIG. 1). According to other non-limiting aspects, certain steps of the method 500 can be performed by the AGMX platform 102 (FIG. 1) and other steps of the method 500 can be performed by a control node or any other AI engine that is local to the operating environment 110 (FIG. 1). It shall be further appreciated that FIG. 5 presents a non-exhaustive list of steps of the method 500, strictly for illustrative purposes. Accordingly, it shall be appreciated that, according to some non-limiting aspects, the method 500 can include additional functionality described herein but not depicted in FIG. 5.

According to the non-limiting aspect of FIG. 5, the method 500 can include receiving 502, a user input that can include a pre-defined objective. According to some non-limiting aspects, the user input can further include one or more other parameters, such as a number or type of nodes of the plurality of nodes $112$, $114_a$, $114_b$, $116_a$, $116_b$, $116_c$, to be deployed to accomplish the objective, a specific instruction to be assigned to a specific node of the plurality of nodes $112$, $114_a$, $114_b$, $116_a$, $116_b$, $116_c$, and/or one or more management authority protocols $302$ (FIG. $3$) for one or more nodes of the plurality of nodes $112$, $114_a$, $114_b$, $116_a$, $116_b$, $116_c$. Based on the user input—and more specifically, one or more parameters provided via the user input—the method $500$ can further include generating $504$ an AGMX file $101$ (FIG. $1$). The AGMX file $101$ (FIG. $1$) can include, for example, one ore more instructions for one or more nodes of the plurality of nodes $112$, $114_a$, $114_b$, $116_a$, $116_b$, $116_c$, to execute to either accomplish or advance accomplishment of the user-defined objective, in compliance with the management authority protocols $302$ (FIG. $3$) assigned to the nodes of the plurality of nodes $112$, $114_a$, $114_b$, $116_a$, $116_b$, $116_c$, the AGMX file $101$ (FIG. $1$) designates for deployment. Generating $504$ the AGMX file $101$ will be described in further detail with reference to FIG. $6$.

In further reference to FIG. $5$, the method $500$ can further include transmitting $506$ the AGMX file $101$ (FIG. $1$) to at least one node of the plurality of nodes $112$, $114_a$, $114_b$, $116_a$, $116_b$, $116_c$, (FIG. $1$) and determining $508$, based on the AGMX file $100$ (FIG. $1$), whether For example, the receiving node may be designated control node a that, according to the AGMX file $101$ (FIG. $1$), may have been granted permissions pursuant to the aforementioned sixth management authority protocol $302_f$ (FIG. $3$), seventh management authority protocol $302_g$ (FIG. $3$), or eighth management authority protocol $302_h$ (FIG. $3$), as previously described. The control node, therefore, can either transmit relevant instructions from the AGMX file $101$ (FIG. $1$) the one or more other nodes of the plurality of nodes $112$, $114_a$, $114_b$, $116_a$, $116_b$, $116_c$, (FIG. $1$), or may generate an SAGMX file $400$ (FIG. $4$) for distribution to one or more other nodes of the plurality of nodes $112$, $114_a$, $114_b$, $116_a$, $116_b$, $116_c$, (FIG. $1$). According to some non-limiting aspects, the receiving node may be a single node configured to exclusively execute the instructions within the AGMX file $101$ (FIG. $1$) to accomplish the objective in compliance with the management authority protocols $302$ (FIG. $3$), without having to deploy other nodes of the plurality of nodes $112$, $114_a$, $114_b$, $116_a$, $116_b$, $116_c$, (FIG. $1$).

Still referring to FIG. $5$, assuming a control node has been designated by the AGMX file $101$ (FIG. $1$), the method $500$ can further include causing $510$ the control node to generate one or more SAGMX files $400$ (FIG. $4$). One or more nodes of the plurality of nodes $112$, $114_a$, $114_b$, $116_a$, $116_b$, $116_c$, (FIG. $1$) can execute instructions based on the AGMX file $101$ and/or SAGMX file $400$ (FIG. $4$). The method $500$ can further include receiving $512$ sensor data from one or more nodes of the plurality of nodes $112$, $114_a$, $114_b$, $116_a$, $116_b$, $116_c$, (FIG. $1$), including the designated control node itself. Based on the received sensor data, the method $500$ can further include determining $514$ whether the objective has been accomplished. If it is determined, based on the sensor data, that the objective has not been accomplished, the method $500$ can include once again causing $510$ the control node to generate one or more additional SAGMX files $400$ (FIG. $4$). According to other non-limiting aspects, if it is determined, based on the sensor data, that the objective has not been accomplished, the method $500$ can include generating, via the AGMX platform $102$ (FIG. $1$), a modified AGMX file $103$ (FIG. $1$). If it is determined, based on the sensor data, that the objective has been accomplished, then the method $500$ can include terminating $520$ node activity.

According to the non-limiting aspect of FIG. $5$, assuming a control node has not been designated by the AGMX file $101$ (FIG. $1$), the method $500$ can further include receiving sensor data from one or more nodes of the plurality of nodes $112$, $114_a$, $114_b$, $116_a$, $116_b$, $116_c$, (FIG. $1$). Based on the received sensor data, the method $500$ can further include determining $518$ whether the objective has been accomplished. If it is determined, based on the sensor data, that the objective has not been accomplished, the method $500$ can include generating $504$, via the AGMX platform $102$ (FIG. $1$), another AGMX file $101$ (FIG. $1$) or modified AGMX file $103$ (FIG. $1$). If it is determined, based on the sensor data, that the objective has been accomplished, then the method $500$ can include terminating $520$ node activity.

Referring now to FIG. $6$, an algorithmic flow diagram of a method $504$ of generating an AGMX file, as used by the method $500$ of FIG. $5$, is depicted according to at least one non-limiting aspect of the present disclosure. It shall be appreciated that, although the non-limiting aspect of FIG. $6$ illustrates the use of a transformer-based model to generate the AGMX file $101$ (FIG. $1$) using language modeling and task-generation for output code, the present disclosure contemplates other non-limiting aspects that use other models to generate the AGMX file $101$ (FIG. $1$), including sequence-to-sequence models (e.g., for machine translation), attention mechanisms (e.g., to understand context), recurrent neural networks (e.g., to generate code and create code structure), long short-term memory networks, reinforcement learning models (e.g., to fine-tune and optimize code), generational adversarial networks (e.g., to generate and discriminate code to promote accuracy), and/or variational autoencoders (e.g., to compress data into a latent space), amongst others. According to other non-limiting aspects, a hybrid model may be used, combining aspects of other models to achieve the same effect.

According to the non-limiting aspect of FIG. $6$, the method $504$ can include training $602$ the AI model—stored in a memory $107$ (FIG. $1$) of the AGMX platform $102$ (FIG. $1$) and executed by the control circuit $105$ (FIG. $1$)—using a data set relevant to the operating environment $110$ (FIG. $1$), the plurality of nodes $112$, $114_a$, $114_b$, $116_a$, $116_b$, $116_c$, (FIG. $1$), and/or the objective. It shall be appreciated that the data set used to train the AI model can include sensor data, maps, specifications, and/or additional information relevant to the operating environment $110$ (FIG. $1$), the plurality of nodes $112$, $114_a$, $114_b$, $116_a$, $116_b$, $116_c$, (FIG. $1$), and/or the objective. Preferably, the data set can be cleaned, normalized, and transformed into a format the algorithm can process. For example, according to the non-limiting aspect of FIG. $6$, wherein the model includes a transformer, the data set can be presented via a self-attention mechanism such that the AI model can weigh the importance of different parts of the input sequence and learn complex relationships within the data set. However, according to the non-limiting aspect wherein the model includes a generational adversarial network, the data set can be fake data generated by the generator sub-model and the discriminator sub-model can evaluate the data against real data provided by the user. The generator, therefore, can improve in order to fool the discriminator. Wherein a variational autoencoder is used, the model can encode data into a latent space and decode it back, minimizing the difference between the original and generated data. The data set can be either manually presented to the AI model or autonomously generated and presented to the AI model via a control loop performed by the system 100 (FIG. 1).

Figure 6:
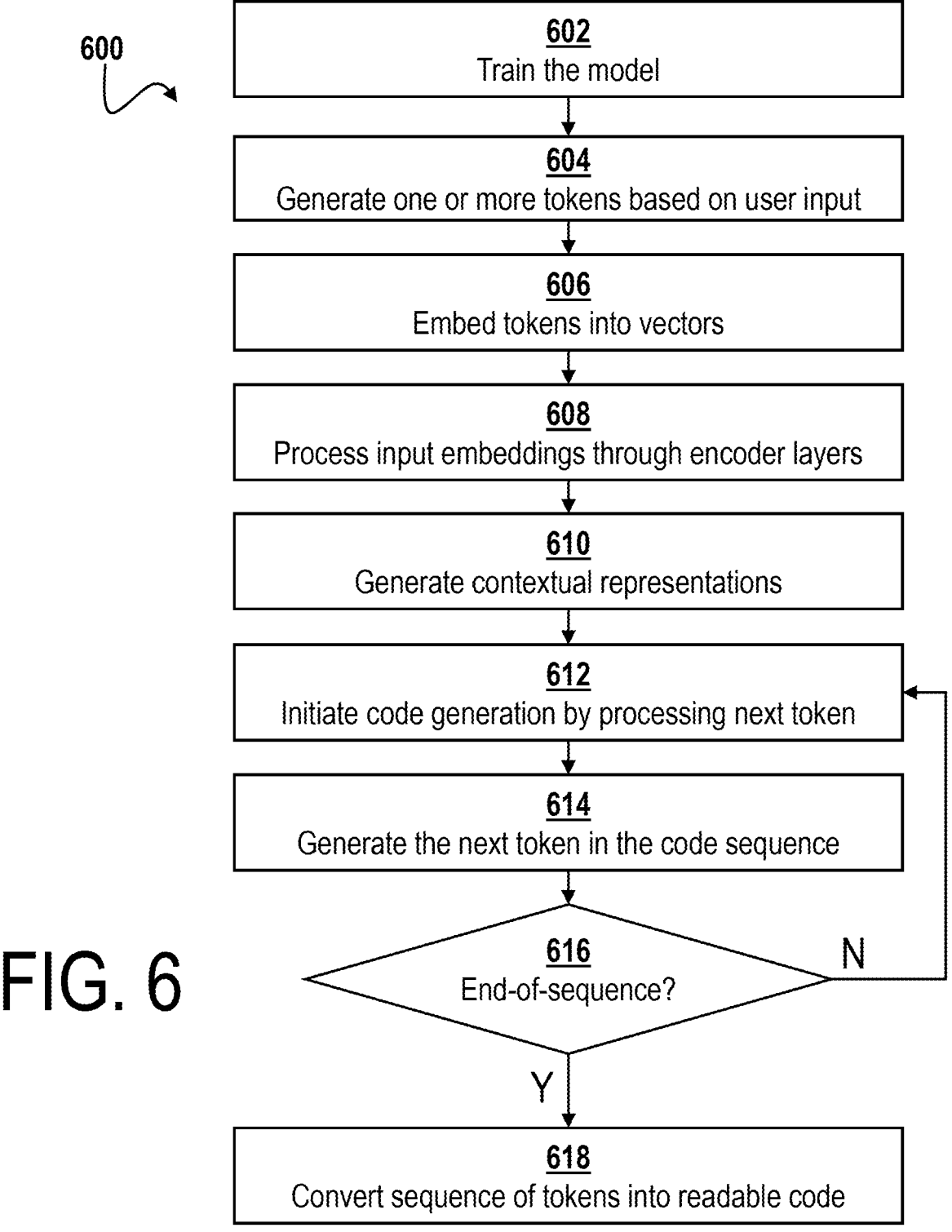
FIG. 6 illustrates an algorithmic flow diagram of a method of generating an AGMX file, as used by the method of FIG. 5, in accordance with at least one non-limiting aspect of the present disclosure.

Once the AI model is trained, the method 504 of FIG. 6 can further include, based on the received 502 (FIG. 5) user input, generating 604 one or more tokens (e.g., small units of text) based on the user input. As previously described, the user input can include the user-defined objective, a number or type of nodes of the plurality of nodes 112, 114$_a$, 114$_b$, 116$_a$, 116$_b$, 116$_c$, to be deployed to accomplish the objective, a specific instruction to be assigned to a specific node of the plurality of nodes 112, 114$_a$, 114$_b$, 116$_a$, 116$_b$, 116$_c$, and/or one or more management authority protocols 302 (FIG. 3) for one or more nodes of the plurality of nodes 112, 114$_a$, 114$_b$, 116$_a$, 116$_b$, 116$_c$. The method 504 can further include embedding 606 the tokens into high-dimensional vectors using pre-trained embeddings and processing 608 the input embeddings through encoder layers of the transformer model. It shall be appreciated that each layer can apply self-attention and feed-forward neural network techniques to derive contextual information from the user input. Once processed, the method 504 can further include generating 610 contextual representations (e.g., unlike static representations) of the input tokens, which can dynamically provide context of a token based on its use and relationship to other tokens generated based on the user input, providing context for the objective, or protocols requested. It shall be appreciated that these can allow the model to understand the meaning and relationships of the inputs provided via the user input.

The method 504 of FIG. 6 can further include initiating 612 the code generation process by processing the input embeddings through the encoder layers of the transformer model. Each layer of the model, for example, can apply self-attention and encoder-decoder attention mechanisms to predict the next token. The method 504 can further include continuing the code generation by generating 614 the next token in the code sequence based on the data set provided via training 602 and predicting the next token based on the decoder's output. Eventually, the method 504 includes checking 616 if the code is at the end-of-sequence, having accounted for each token and therefore, each parameter within the user input. If the code is not at the end-of-sequence, the method 504 can include initiating 612 the code generation once more by processing the next token. If the code is at the end-of-sequence, the method 504 can include the process of detokenization by converting 618 the sequence of tokens into readable code.

Figure 7:
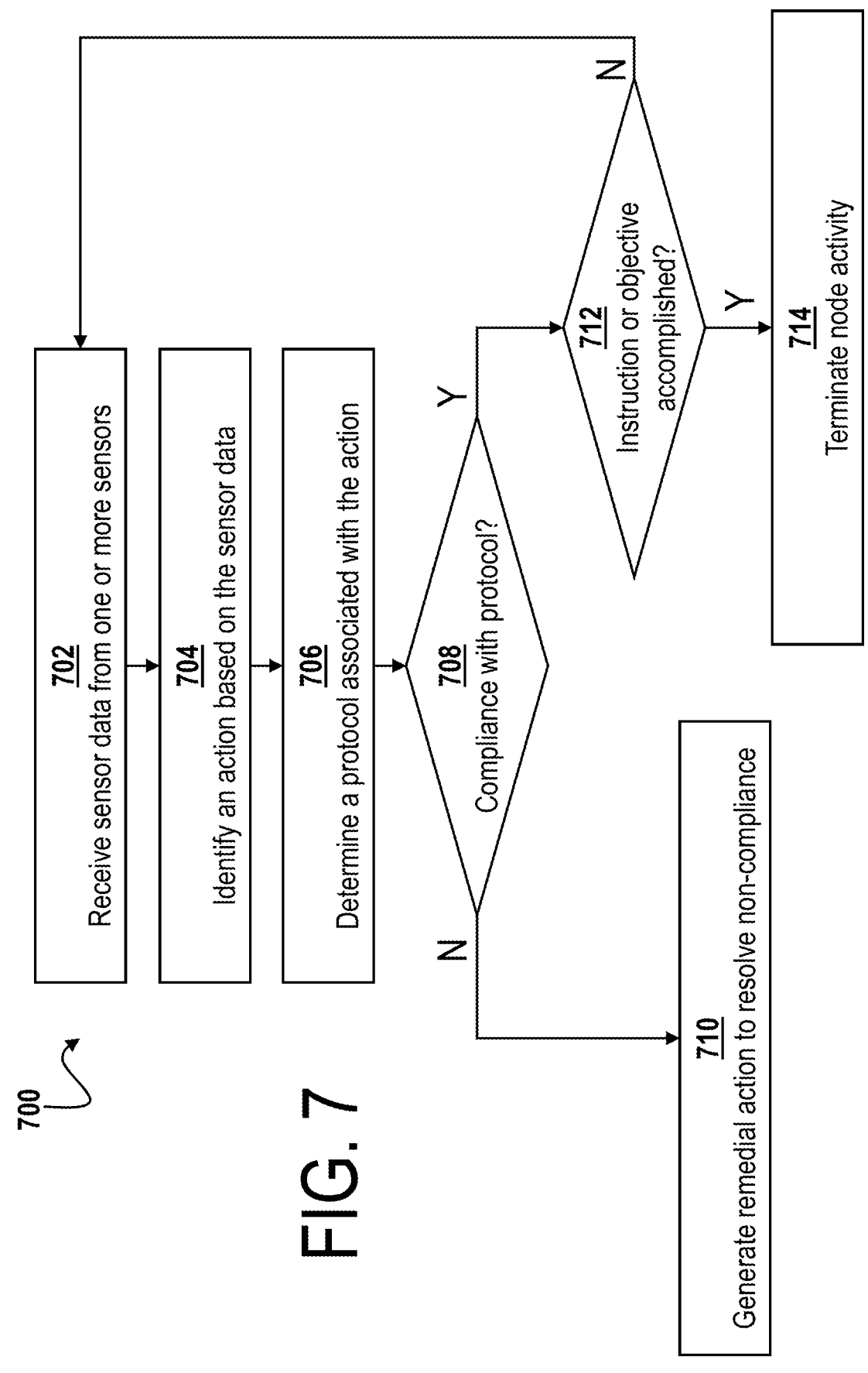
FIG. 7 illustrates an algorithmic flow diagram of a method of enforcing protocols, in accordance with at least one non-limiting aspect of the present disclosure.

Referring now to FIG. 7, an algorithmic flow diagram of a method 700 of enforcing protocols is depicted in accordance with at least one non-limiting aspect of the present disclosure. It shall be appreciated that the method 700, for example, can be performed by any of the control circuits described herein, including the control circuit 109 (FIG. 1) of the risk management platform 104 (FIG. 1) of the system 100 of FIG. 1. The control circuits, for example, can be configured to perform the method 700 in response to instructions provided by the protocol rules engine, which can be stored in any of the memories described herein, including the memory 111 (FIG. 1) of the risk management platform 104 (FIG. 1) of the system 100 of FIG. 1. According to some non-limiting aspects, the protocol rules engine can include an algorithm or AI model used to perform one or more steps of the method 700 of FIG. 7. According to other non-limiting aspects, the method 700 can be stored in a memory 204 (FIG. 2) and performed by the control circuit 202 (FIG. 2) of a designated control node, or any other AI engine that is local to the operating environment 110 (FIG. 1). According to other non-limiting aspects, certain steps of the method 700 can be performed by the risk management platform 104 (FIG. 1) and other steps of the method 500 can be performed by a control node or any other AI engine that is local to the operating environment 110 (FIG. 1).

According to some non-limiting aspects, the risk management platform 104 (FIG. 1) can separately perform the method 700 independent of other components of the system 100 (FIG. 1). It shall be appreciated that separating the monitoring functions of the method 700 from certain implementing functions—such as those performed by the AGMX platform 102 (FIG. 1) and/or plurality of nodes 112, 114$_a$, 114$_b$, 116$_a$, 116$_b$, 116$_c$, (FIG. 1)—can provide an independent means of monitoring, controlling, modifying, and/or cancelling one or more activities performed by the AGMX platform 102 (FIG. 1) and/or the plurality of nodes 112, 114$_a$, 114$_b$, 116$_a$, 116$_b$, 116$_c$, (FIG. 1). As previously discussed, this may imbue the system 100 (FIG. 1) with "checks and balances" and therefore, greater security.

According to the non-limiting aspect of FIG. 7, the method 700 can include receiving 702 sensor data from one or more sensors, wherein the sensor data is associated with an action executed by one or more of the plurality of nodes 112, 114$_a$, 114$_b$, 116$_a$, 116$_b$, 116$_c$, (FIG. 1). The sensor data can be generated by a sensor 206 (FIG. 2) of a node 200 (FIG. 2) or by a sensor positioned in the operating environment 110 (FIG. 1) independent of the plurality of nodes 112, 114$_a$, 114$_b$, 116$_a$, 116$_b$, 116$_c$, (FIG. 1). The method 700 can further include identifying 704 at least one action based on the received sensor data. For example, according to a non-limiting aspect wherein the sensor data may include force data associated with an end effector or gripper of a node of the plurality of nodes 112, 114$_a$, 114$_b$, 116$_a$, 116$_b$, 116$_c$, (FIG. 1), the identification 704 may include determining that the node of the plurality of nodes 112, 114$_a$, 114$_b$, 116$_a$, 116$_b$, 116$_c$, (FIG. 1) is performing the action of lifting a box. However, other types of sensor data (e.g., humidity readings, video data, temperatures, image data, video data, audio data, position data, etc.) may be used to identify other actions performed by the node (e.g., the node is moving in a particular manner, traversing a particular portion of the operating environment 110 (FIG. 1), performing a particular action, such as welding, etc.).

In further reference to FIG. 7, the method 700 can further include determining 706 at least one protocol associated with the identified action performed by the one or more of the plurality of nodes 112, 114$_a$, 114$_b$, 116$_a$, 116$_b$, 116$_c$, (FIG. 1) based on the received sensor data. The determination 706, for example, can include referencing a copy of the AGMX file 101 (FIG. 1) via a look up table or any other means of comparing the identified action to one or more instructions generated by the AGMX platform 102 (FIG. 1). Once the protocol has been determined, the method 700 can further include determining 706 whether or not the action of the one or more of the plurality of nodes 112, 114$_a$, 114$_b$, 116$_a$, 116$_b$, 116$_c$, (FIG. 1) complies with the determined protocol. In other words, the method 700 can include a determination of whether the node was permitted, via the protocol, to lift the box, or move in the identified, particular manner, or traverse to the identified, particular portion of the operating environment 110 (FIG. 1), etc. The specific algorithmic method of determining 706 whether or not the action of the one or more of the plurality of nodes 112, 114$_a$, 114$_b$, 116$_a$, 116$_b$, 116$_c$, (FIG. 1) complies with the determined protocol will be discussed in further detail with reference to FIG. 8.

Still referring to FIG. 7, assuming it is determined that the action of the one or more of the plurality of nodes 112, 114$_a$, 114$_b$, 116$_a$, 116$_b$, 116$_c$, (FIG. 1) does in fact comply with the determined protocol, the method 700 can further include determining 712 whether the objective or particular instruction, as specified by the AGMX file 101 (FIG. 1), has been accomplished. Assuming it is determined that the objective has been accomplished, the method 700 can further include terminating 714 one or more activities of the one or more nodes of the plurality of nodes 112, 114$_a$, 114$_b$, 116$_a$, 116$_b$, 116$_c$, (FIG. 1). However, it is determined that the objective has not been accomplished, the method 700 can further include continuing to monitor the plurality of nodes 112, 114$_a$, 114$_b$, 116$_a$, 116$_b$, 116$_c$, (FIG. 1) by once again receiv- ing 702 sensor data from one or more sensors associated with the plurality of nodes 112, 114$_a$, 114$_b$, 116$_a$, 116$_b$, 116$_c$ (FIG. 1). If for example, it is determined that the action of the one or more of the plurality of nodes 112, 114$_a$, 114$_b$, 116$_a$, 116$_b$, 116$_c$, (FIG. 1) does not comply with the deter- mined protocol, the method 700 can further include generating 710 a remedial action to resolve the determined non-compliance. The remedial action can include an action that is autonomously implemented, manually implemented, or implemented by one or more nodes of the plurality of nodes 112, 114$_a$, 114$_b$, 116$_a$, 116$_b$, 116$_c$, (FIG. 1), such as a control node.

The remedial action, for example, can include the gen- eration of a modified AGMX file 103 (FIG. 1) that includes at least one modified instruction, modified objective, and/or modified protocol for at least one of the plurality of nodes 112, 114$_a$, 114$_b$, 116$_a$, 116$_b$, 116$_c$, (FIG. 1). The modified AGMX file 103 (FIG. 1), for example, can alter an instruc- tion or management authority protocol assigned to the non-complying node of the plurality of nodes 112, 114$_a$, 114$_b$, 116$_a$, 116$_b$, 116$_c$, (FIG. 1), or can cause another node of the plurality of nodes 112, 114$_a$, 114$_b$, 116$_a$, 116$_b$, 116$_c$, (FIG. 1) to intervene with the non-complying node of the plurality of nodes 112, 114$_a$, 114$_b$, 116$_a$, 116$_b$, 116$_c$, (FIG. 1). However, the remedial action can further include a com- mand that may cause the plurality of nodes 112, 114$_a$, 114$_b$, 116$_a$, 116$_b$, 116$_c$, to alter their behavior within the operating environment, power down, and/or disable or enable certain components 202, 204, 206, 208 210, 212 (FIG. 2) of the node structure (FIG. 2). For example, the remedial action can include terminating at least one of the plurality of nodes 112, 114$_a$, 114$_b$, 116$_a$, 116$_b$, 116$_c$, (FIG. 1) or disabling certain features of at least one of the plurality of nodes 112, 114$_a$, 114$_b$, 116$_a$, 116$_b$, 116$_c$, (FIG. 1).

Additionally, the remedial action can include one or more commands to alter an operation of infrastructure within the operating environment 110 (FIG. 1). For example, the reme- dial action can include a command to shut off electrical power to at least a portion of the operating environment 110 (FIG. 1), closing a door and/or window in the operating environment 110 (FIG. 1), and/or actuating and obstacle or barrier within the operating environment 110 (FIG. 1), amongst other commands. Alternately, the remedial action may include generation of an alert (e.g., audible, haptic, visual, etc.) to be displayed or otherwise presented within the operating environment 110 (FIG. 1), indicating that at least one of the plurality of nodes 112, 114$_a$, 114$_b$, 116$_a$, 116$_b$, 116$_c$, (FIG. 1) is not complying with a protocol and prompting manual attention and/or intervention. The alert, for example, may include instructions for a manual operator (or control node) within the operating environment 110 (FIG. 1) to service, disable, reprogram, or otherwise inter- vene with at least one of the plurality of nodes 112, 114$_a$, 114$_b$, 116$_a$, 116$_b$, 116$_c$, (FIG. 1). Once generated, the method 700 can further include transmitting the remedial action to the operating environment 110 (FIG. 1) and/or at least one of the plurality of nodes 112, 114$_a$, 114$_b$, 116$_a$, 116$_b$, 116$_c$, (FIG. 1).

Figure 8:
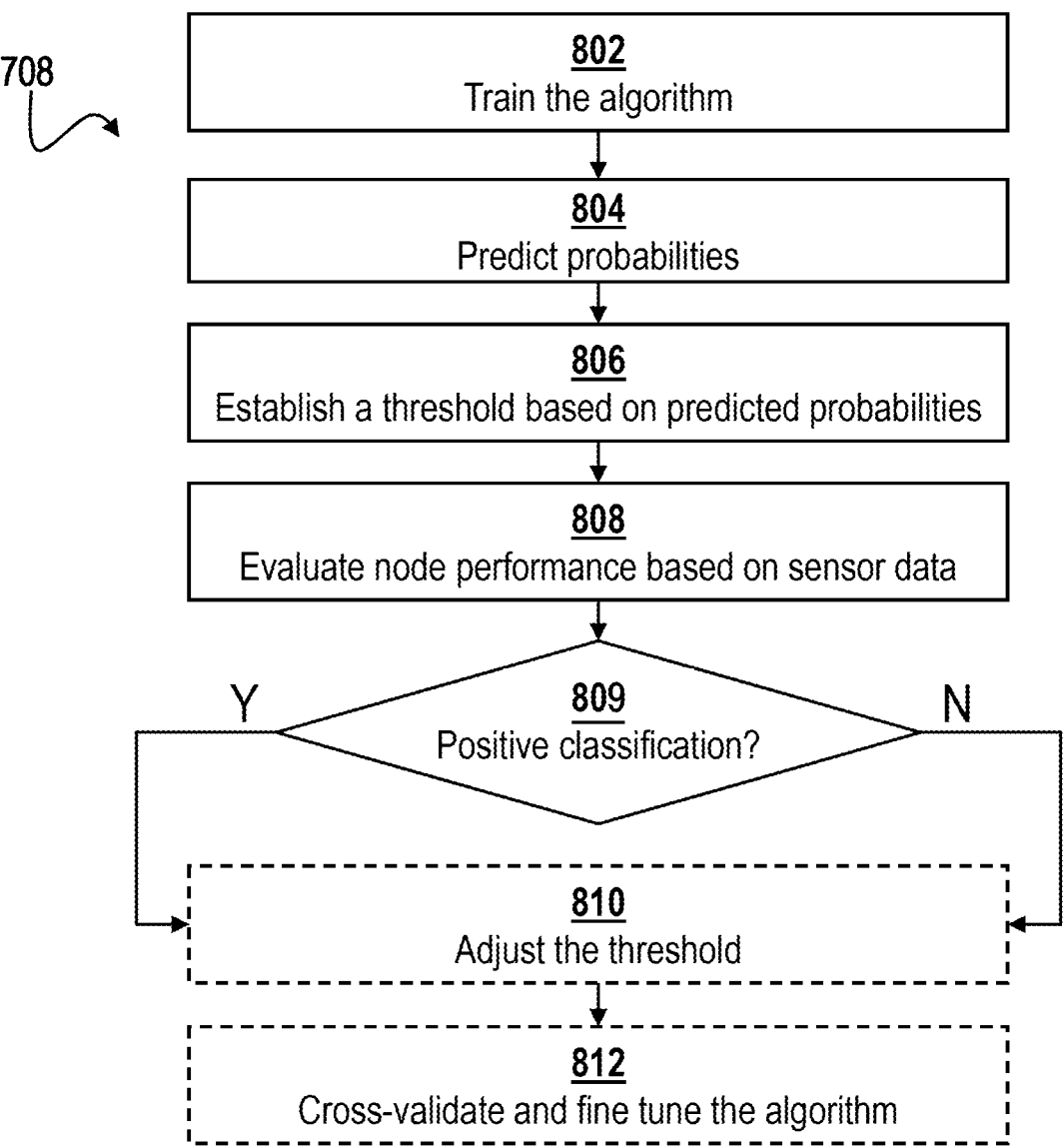
FIG. 8 illustrates an algorithmic flow diagram of a method of determining compliance with a protocol, as used by the method of FIG. 7, in accordance with at least one non-limiting aspect of the present disclosure.

Referring now to FIG. 8, an algorithmic flow diagram of a method 708 of determining compliance with a protocol, as used by the method 700 of FIG. 7, is depicted according to at least one non-limiting aspect of the present disclosure. It shall be appreciated that, although the non-limiting aspect of FIG. 8 illustrates the use of a Machine Learning Classifi- cation algorithm to determine compliance with a protocol, the present disclosure contemplates other non-limiting aspects that use other algorithmic means to determine com- pliance with a protocol, including binary search algorithms, peak detection algorithms, moving average or exponential smoothing algorithms, event detection algorithms, and/or statistical algorithms (e.g., Z-score, etc.), amongst others. Each of these algorithms have specific strengths and are suited for different types of threshold measurement tasks. The algorithm should be selected based on a specific appli- cation context, data characteristic, and nature of the thresh- old being measured. However, the Machine Learning Clas- sification algorithm of FIG. 8 can be suitable for complex or non-linear threshold determination tasks. The method 708 can include training a classification model (e.g., support vector machines ("SVM"), decision trees, etc.) to classify data points or observations as either above or below the threshold based on features extracted from the data. Such algorithms can manage complex relationships and adapt to varying data patterns.

According to the non-limiting aspect of FIG. 8, the method 708 can include training 802 the algorithm using a data set relevant to a set of protocols 302 (FIG. 3), 402 (FIG. 4) and/or the AGMX file (FIG. 1) and its instructions and objectives. It shall be appreciated that the data set used to train the algorithm can include sensor data that has been correlated to certain actions associated with the plurality of nodes 112, 114$_a$, 114$_b$, 116$_a$, 116$_b$, 116$_c$, (FIG. 1). The correlations can be represented via labels within the data set. For example, the labeled data set can include labels associ- ated with various input features and corresponding class labels so they are then known by the algorithm and can be recognized moving forward. The labels, for example, can be associated with certain actions and/or protocols. During training, the algorithm can learn patterns and relationships in the data set, based on the labels, to be able to distinguish between different classes. Preferably, the data set can be cleaned, normalized, and transformed into a format the algorithm can process. The data set can be either manually presented to the AI model or autonomously generated and presented to the AI model via a control loop performed by the system 100 (FIG. 1).

Once the algorithm is trained, the method 708 of FIG. 8 can further include, predicting 804 probabilities of various inputs belonging to one or more labeled classes. For binary classifications (e.g., compliance or non-compliance, etc.), the prediction can include whether an input belongs to a positive class (e.g., class "1" or compliance) or a negative class (e.g., class "0" or non-compliance). The method 708 can further include establishing 806 a threshold based on the probabilities. For example, a threshold may be established by converting the predicted probabilities into class labels, for example, in a binary classification, a common default threshold may be 0.5. If the predicted probability of the positive class (e.g., compliance), for example, is greater than or equal to the threshold, the input can be classified as compliant to the protocol. Otherwise, it is classified in the negative class (e.g., non-compliance). Accordingly, the threshold is established based, at least in part, on the predicted probabilities.

Upon the aforementioned receipt 702 (FIG. 7) of the sensor data, identification 704 (FIG. 7) of an action, and determination 706 (FIG. 7) of a protocol, the method 708 of FIG. 8 can include evaluating 808 the performance of one or more nodes from the plurality of nodes 112, 114$_a$, 114$_b$, 116$_a$, 116$_b$, 116$_c$, (FIG. 1) by classifying 809 the sensor data based on the established threshold and the training data— and more specifically, the labels within the training data set. For example, the received sensor data can be classified in the positive class (e.g., compliance) if the algorithm determines calculates a score for the sensor data that meets or exceeds the established threshold for the identified activity and determined protocol. Otherwise, the sensor data can be classified in the negative class (e.g., non-compliance) for the identified activity and determined protocol. Based on the classification, the method 700 of FIG. 7 can include generating 710 (FIG. 7) a remedial action or determining 712 (FIG. 7) whether a particular instruction or objective has been accomplished, as previously discussed.

It shall be appreciated that, according to some non-limiting aspects, the algorithm itself can be evaluated using various metrics, such as accuracy, precision, recall, F1 score, and the area under an ROC curve (AUC-ROC), amongst other metrics. Such metrics can help determine how well the model is performing and can guide the choice of an optimal threshold. Accordingly, the method 708 can further include adjusting 810 the threshold. For example, based on the specific application and the importance of various errors, the threshold can be adjusted to improve the algorithm's future performance. The trade-off between a true positive rate (e.g., sensitivity) and a false positive rate (e.g., 1-specificity) can be visualized via an receiver operating characteristic ("ROC") curve, which can be used to determine an optimal threshold balancing these two rates. The method 708 can further include cross-validating the algorithm and fine tuning it, accordingly. For example, this can include splitting the dataset into training and validation sets multiple times to ensure the algorithm generalizes well to unseen data.

According to other non-limiting aspects, the method 708 can further include a Binary Search Algorithm, used when the threshold value is within a sorted list or range. It shall be appreciated that such algorithms can iteratively narrow down the range of threshold values by halving the search space based on comparisons with the threshold condition. This can be efficient for large datasets or continuous data where direct comparisons are feasible.

According to other non-limiting aspects, the method 708 can further include a Peak Detection Algorithm, which may be useful when the threshold corresponds to peaks or local maxima in data. Algorithms like Peak Detection by Prominence or Peak Detection by Threshold can be used to identify peaks above a certain threshold in signal or time-series data. This can be robust for noisy data and can manage real-time processing requirements effectively.

According to other non-limiting aspects, the method 708 can further include Moving Average or Exponential Smoothing algorithms. This can be particularly useful when the threshold is based on trends or averages over time. Such algorithms may calculate moving averages or use exponential smoothing techniques to smooth out noise and detect when data points exceed a certain threshold relative to the smoothed data. This may help in identifying trends and gradual changes rather than sudden spikes.

According to other non-limiting aspects, the method 708 can further include Statistical Method (e.g., Z-score) algorithms. These can be used when the threshold is based on statistical properties of the data and may involve calculating statistical metrics such as Z-score to determine when data points deviate significantly from the mean or expected values. Such algorithms can provide a probabilistic measure of threshold crossing based on data distribution.

According to other non-limiting aspects, the method 708 can further include Event Detection algorithms suitable for time-series or streaming data where thresholds correspond to specific events or anomalies. Such algorithms may include cumulative sum ("CUSUM") and/or exponentially weighted moving average ("EWMA") techniques to detect when data deviates significantly from expected patterns or thresholds and may be effective for continuous monitoring and early detection of deviations.

Examples of the methods and systems disclosed herein, according to various aspects of the present disclosure, are provided below in the following embodiments. An aspect of the methods may include any one or more than one of, and any combination of, the embodiments described below.

According to a first non-limiting aspect of the present disclosure, a system for autonomously generating an implementing a machine executable file is provided. The system can include a node and an AGMX platform communicatively coupled to the node, wherein the AGMX platform includes a control circuit and a memory to store an artificial intelligence ("AI") model that, when executed by the control circuit, causes the AGMX platform to: receive a user input including an objective; generate an instruction for the node to execute based on the objective; determine a management authority protocol to be assigned to the node, wherein the management authority protocol defines an ability of the node to deviate from the instruction; generate an AGMX file including the instruction and the management authority protocol, wherein the AGMX file is to be executed by the node; and transmit the AGMX file to the node for execution by the node.

Additionally, according to the first non-limiting aspect, the node can include a sensor to generate sensor data. Thus, according to the first non-limiting aspect, when executed by the control circuit, the AI model further causes the AGMX platform to: receive the sensor data from the node; generate a modified AGMX file based on the sensor data, wherein the modified AGMX file is to be executed by the node in lieu of the AGMX file; and transmit the modified AGMX file to the node for execution by the node. Furthermore, according to the first non-limiting aspect, the system can further include a risk management platform communicatively coupled to the node, wherein the risk management platform includes a second control circuit and a second memory to store an algorithm that, when executed by the second control circuit, causes the risk management platform to: receive the sensor data from the node; detect the management authority protocol assigned to the node; determine a non-compliance to the management authority protocol based on the sensor data; and generate a remedial action to resolve the non-compliance. The remedial action can include at least one of a modified AGMX file, a command to power the node down, a command to disable a component of the node, a command to operate infrastructure within an operating environment of the node, or an alert to be presented within the operating environment of the node, or combinations thereof. The management authority protocol can enable the node to resolve a physical obstruction unforeseen by the AGMX file without requiring intervention from the AGMX platform.

Alternately, the management authority protocol can enable the node to revise an executable plan defined by the AGMX file without requiring intervention from the AGMX platform. Alternately, the management authority protocol can enable the node to vary from a vector defined by the AGMX file without requiring intervention from the AGMX platform. The management authority protocol can further designate the node as a control node relative to a second node.

Additionally, according to the first non-limiting aspect, the node can include a third control circuit and a third memory to store a local AI engine that, when executed by the third control circuit, causes the node to: generate a second instruction for the second node to execute based on the objective; determine a second management authority protocol to be assigned to the second node, wherein the second management authority protocol defines an ability of the second node to deviate from the second instruction, and wherein the second management authority protocol requires the second node to be subservient to the node; generate an SAGMX file including the second instruction and the second management authority protocol, and wherein the SAGMX file is to be executed by the second node; and transmit the SAGMX file to the second node for execution by the second node. The second node can include a sensor to generate sensor data, and wherein, when executed by the control circuit, the local AI engine further causes the node to: receive the sensor data from the second node; generate a modified SAGMX file based on the sensor data, wherein the modified SAGMX file is to be executed by the second node in lieu of the SAGMX file; and transmit the modified SAGMX file to the second node for execution by the second node.

According to a second non-limiting aspect, an artificial intelligence generated machine executable ("AGMX") platform for autonomously generating an implementing a machine executable file is provided. The AGMX platform can include a control circuit and a memory to store an artificial intelligence ("AI") model that, when executed by the control circuit, causes the AGMX platform to: receive a user input including an objective; generate an instruction for a node to execute based on the objective; determine a management authority protocol to be assigned to the node, wherein the management authority protocol defines an ability of the node to deviate from the instruction; generate an AGMX file including the instruction and the management authority protocol, wherein the AGMX file is to be executed by the node; and transmit the AGMX file to the node for execution by the node.

Additionally, according to the second non-limiting aspect, the node can include a sensor to generate sensor data, and wherein, when executed by the control circuit, the AI model further causes the AGMX platform to: receive the sensor data from the node; generate a modified AGMX file based on the sensor data, wherein the modified AGMX file is to be executed by the node in lieu of the AGMX file; and transmit the modified AGMX file to the node for execution by the node. The management authority protocol can enable the node to revise an executable plan defined by the AGMX file without requiring intervention from the AGMX platform. Alternately, the management authority protocol can enable the node to vary from a vector defined by the AGMX file without requiring intervention from the AGMX platform.

According to a third non-limiting aspect, a method for autonomously generating an implementing a machine executable file is provided. The method can include receiving, via a control circuit, a user input including an objective; generating, via the control circuit, an instruction for a node to execute based on the objective; determining, via the control circuit, a management authority protocol to be assigned to the node, wherein the management authority protocol defines an ability of the node to deviate from the instruction; generating, via the control circuit, an AGMX file including the instruction and the management authority protocol, wherein the AGMX file is to be executed by the node; transmitting, via the control circuit, the AGMX file to the node for execution by the node; and receiving sensor data from the node based on execution of the AGMX file by the node.

Additionally, according to the third non-limiting aspect, the method can further include generating a modified AGMX file based on the sensor data, wherein the modified AGMX file is to be executed by the node in lieu of the AGMX file; and transmitting the modified AGMX file to the node for execution by the node. The method of claim can further include detecting the management authority protocol assigned to the node; determining a non-compliance to the management authority protocol based on the sensor data; and generating a remedial action to resolve the non-compliance. The remedial action can include at least one of a modified AGMX file, a command to power the node down, a command to disable a component of the node, a command to operate infrastructure within an operating environment of the node, or an alert to be presented within the operating environment of the node, or combinations thereof. Additionally, according to the third non-limiting aspect, the method can include generating a second instruction for a second node to execute based on the objective; determining a second management authority protocol to be assigned to the second node, wherein the second management authority protocol defines an ability of the second node to deviate from the second instruction, and wherein the second management authority protocol requires the second node to be subservient to the node, generating an sub-artificial intelligence generated machine executable ("SAGMX") file including the second instruction and the second management authority protocol, and wherein the SAGMX file is to be executed by the second node, and transmitting the SAGMX file to the second node for execution by the second node.

All patents, patent applications, publications, or other disclosure material mentioned herein, are hereby incorporated by reference in their entirety as if each individual reference was expressly incorporated by reference, respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative aspects. The aspects described herein are understood as providing illustrative features of varying detail of various aspects of the disclosed invention; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the disclosed invention. Accordingly, it will be recognized by persons having ordinary skill in the art that various substitutions, modifications, or combinations of any of the exemplary aspects may be made without departing from the scope of the invention. In addition, persons skilled in the art will recognize, or be able to ascertain using no more than routine experimentation, many equivalents to the various aspects of the invention described herein upon review of this specification. Thus, the invention is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may be performed in any order. Also, although claim recitations are presented in a sequence(s), it should be understood that the various operations may be performed in other orders than those which are described or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all subranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements but is not limited to possessing only those one or more elements. Likewise, an element of a system, device, or apparatus that "comprises," "has," "includes" or "contains" one or more features possesses those one or more features but is not limited to possessing only those one or more features.

Instructions used to program logic to perform various disclosed aspects can be stored within a memory in the system, such as dynamic random-access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random-access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microcontroller configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware, and/or circuitry configured to perform any of the aforementioned operations. Software may be embodied as a software package, code, instructions, instruction sets and/or data recorded on non-transitory computer readable storage medium. Firmware may be embodied as code, instructions or instructions sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard," published in December 2008 and/or later versions of this standard. Alternatively, or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively, or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively, or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different, and/or after-developed connection-oriented network communication protocols are equally contemplated herein.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can encompass active-state components and/or inactive-state components and/or standby-state components unless context requires otherwise.

The terms "proximal" and "distal" are used herein with reference to a clinician manipulating the handle portion of the surgical instrument. The term "proximal" refers to the portion closest to the clinician and the term "distal" refers to the portion located away from the clinician. It will be further appreciated that, for convenience and clarity, spatial terms such as "vertical," "horizontal," "up," and "down" may be used herein with respect to the drawings. However, surgical instruments are used in many orientations and positions, and these terms are not intended to be limiting and/or absolute.

What is claimed is:

1. A system for autonomously generating and implementing a machine executable file, the system comprising:

a node; and an artificial intelligence generated machine executable ("AGMX") platform communicatively coupled to the node, wherein the AGMX platform comprises a control circuit and a memory to store an artificial intelligence ("AI") model that, when executed by the control circuit, causes the AGMX platform to:

receive a user input comprising an objective;

generate an instruction for the node to execute based on the objective;

determine a management authority protocol to be assigned to the node, wherein the management authority protocol defines an ability of the node to deviate from the instruction;

generate an AGMX file comprising the instruction and the management authority protocol, wherein the AGMX file is to be executed by the node; and transmit the AGMX file to the node for execution by the node; and a risk management platform comprising a second control circuit and a second memory to store an algorithm that, when executed by the second control circuit, causes the risk management platform to:

receive sensor data from the node;

detect the management authority protocol assigned to the node;

determine the node did not comply with the management authority protocol based on a threshold and features extracted from the sensor data associated with the node; and generate a remedial action to resolve the determined non-compliance.

2. The system of claim 1, wherein the node comprises a sensor to generate the sensor data.

3. The system of claim 2, wherein, when executed by the control circuit, the AI model further causes the AGMX platform to:

receive the sensor data from the node;

generate a modified AGMX file based on the sensor data, wherein the modified AGMX file is to be executed by the node in lieu of the AGMX file; and transmit the modified AGMX file to the node for execution by the node.

4. The system of claim 1, wherein the remedial action comprises at least one of a modified AGMX file, a command to power the node down, a command to disable a component of the node, a command to operate infrastructure within an operating environment of the node, or an alert to be presented within the operating environment of the node, or combinations thereof.

5. The system of claim 1, wherein the management authority protocol enables the node to resolve a physical obstruction unforeseen by the AGMX file without requiring intervention from the AGMX platform.

6. The system of claim 1, wherein the management authority protocol enables the node to revise an executable plan defined by the AGMX file without requiring intervention from the AGMX platform.

7. The system of claim 1, wherein the management authority protocol enables the node to vary from a vector defined by the AGMX file without requiring intervention from the AGMX platform.

8. The system of claim 1, wherein the management authority protocol designates the node as a control node relative to a second node.

9. The system of claim 1, wherein the node comprises a third control circuit and a third memory to store a local AI engine that, when executed by the third control circuit, causes the node to:

generate a second instruction for the second node to execute based on the objective;

determine a second management authority protocol to be assigned to the second node, wherein the second management authority protocol defines an ability of the second node to deviate from the second instruction, and wherein the second management authority protocol requires the second node to be subservient to the node;

generate an sub-artificial intelligence generated machine executable ("SAGMX") file comprising the second instruction and the second management authority protocol, and wherein the SAGMX file is to be executed by the second node; and transmit the SAGMX file to the second node for execution by the second node.

10. The system of claim 9, wherein the second node comprises a sensor to generate sensor data, and wherein, when executed by the control circuit, the local AI engine further causes the node to:

receive the sensor data from the second node;

generate a modified SAGMX file based on the sensor data, wherein the modified SAGMX file is to be executed by the second node in lieu of the SAGMX file; and transmit the modified SAGMX file to the second node for execution by the second node.

11. An artificial intelligence generated machine executable ("AGMX") platform for autonomously generating and implementing a machine executable file, the AGMX platform comprising:

a control circuit; and a memory to store an artificial intelligence ("AI") model that, when executed by the control circuit, causes the AGMX platform to:

receive a user input comprising an objective;

generate an instruction for a node to execute based on the objective;

determine a management authority protocol to be assigned to the node, wherein the management authority protocol defines an ability of the node to deviate from the instruction;

generate an AGMX file comprising the instruction and the management authority protocol, wherein the AGMX file is to be executed by the node;

transmit the AGMX file to the node for execution by the node;

generate a modified AGMX file based on sensor data, wherein the modified AGMX file is to be executed by the node in lieu of the AGMX file; and transmit the modified AGMX file to the node for execution by the node.

12. The AGMX platform of claim 11, wherein the node comprises a sensor to generate the sensor data, and wherein, when executed by the control circuit, the AI model further causes the AGMX platform to:

receive the sensor data from the node;

generate a modified AGMX file based on the sensor data, wherein the modified AGMX file is to be executed by the node in lieu of the AGMX file; and transmit the modified AGMX file to the node for execution by the node.

13. The AGMX platform of claim 11, wherein the management authority protocol enables the node to revise an executable plan defined by the AGMX file without requiring intervention from the AGMX platform.

14. The AGMX platform of claim 11, wherein the management authority protocol enables the node to vary from a vector defined by the AGMX file without requiring intervention from the AGMX platform.

15. A method for autonomously generating and implementing a machine executable file, the method comprising:

receiving, via a control circuit, a user input comprising an objective;

generating, via the control circuit, an instruction for a node to execute based on the objective;

determining, via the control circuit, a management authority protocol to be assigned to the node, wherein the management authority protocol defines an ability of the node to deviate from the instruction;

generating, via the control circuit, an AGMX file comprising the instruction and the management authority protocol, wherein the AGMX file is to be executed by the node;

transmitting, via the control circuit, the AGMX file to the node for execution by the node; and receiving sensor data from the node based on execution of the AGMX file by the node;

detecting the management authority protocol assigned to the node;

determining a non-compliance to the management authority protocol based on the sensor data and a threshold; and generating a remedial action to resolve the non-compliance.

16. The method of claim 15, further comprising:

generating a modified AGMX file based on the sensor data, wherein the modified AGMX file is to be executed by the node in lieu of the AGMX file; and transmitting the modified AGMX file to the node for execution by the node.

17. The method of claim 15, wherein the remedial action comprises at least one of a modified AGMX file, a command to power the node down, a command to disable a component of the node, a command to operate infrastructure within an operating environment of the node, or an alert to be presented within the operating environment of the node, or combinations thereof.

18. The method of claim 17, further comprising:

generating a second instruction for a second node to execute based on the objective;

determining a second management authority protocol to be assigned to the second node, wherein the second management authority protocol defines an ability of the second node to deviate from the second instruction, and wherein the second management authority protocol requires the second node to be subservient to the node;

generating an sub-artificial intelligence generated machine executable ("SAGMX") file comprising the second instruction and the second management authority protocol, and wherein the SAGMX file is to be executed by the second node; and transmitting the SAGMX file to the second node for execution by the second node.

19. A risk management platform comprising a control circuit and a memory to store an algorithm that, when executed by the control circuit, causes the risk management platform to:

receive the sensor data from a nodes;

detect a management authority protocol assigned to the node;

determine that the node did not comply with the detected management authority protocol based on a threshold and features extracted from the sensor data associated with the node; and generate a remedial action to resolve the determined non-compliance.

20. The risk management platform of claim 19, wherein the remedial action comprises at least one of a modified AGMX file, a command to power the node down, a command to disable a component of the node, a command to operate infrastructure within an operating environment of the node, or an alert to be presented within the operating environment of the node, or combinations thereof.

* * * * *